United States Patent
Prasad Tanniru et al.

(10) Patent No.: US 11,900,075 B2
(45) Date of Patent: Feb. 13, 2024

(54) SERVERLESS ENVIRONMENT-BASED PROVISIONING AND DEPLOYMENT SYSTEM

(71) Applicant: Accenture Global Solutions Limited, Dublin (IE)

(72) Inventors: Rajendra Prasad Tanniru, Basking Ridge, NJ (US); Aditi Kulkarni, Bangalore (IN); Koushik M. Vijayaraghavan, Chennai (IN); Vijeth Srinivas Hegde, Bangalore (IN); Ravindra Kabbinale, Bangalore (IN); Sreenath Kothavoor, Kannur (IN); Amrutha Pervody Bhat, Bangalore (IN); Meghana B Srinath, Bangalore (IN); Ravi Kiran Singh, Maharashtra (IN); Dilip Krishnan, Bangalore (IN); Naveen Raj K P, Kasaragod (IN); Sumanth Channegowda, Mandya (IN); Vinay Chamarthi, Andhra Pradesh (IN); Lakshmi Srinivasan, Bangalore (IN); Santhosh Mv, Kasaragod (IN)

(73) Assignee: Accenture Global Solutions Limited, Dublin (IE)

( * ) Notice: Subject to any disclaimer, the term of this patent is extended or adjusted under 35 U.S.C. 154(b) by 15 days.

(21) Appl. No.: 17/710,544

(22) Filed: Mar. 31, 2022

(65) Prior Publication Data
US 2023/0315397 A1    Oct. 5, 2023

(51) Int. Cl.
*G06F 8/10*    (2018.01)
*G06F 11/36*    (2006.01)
(Continued)

(52) U.S. Cl.
CPC ................ *G06F 8/10* (2013.01); *G06F 8/436* (2013.01); *G06F 8/71* (2013.01); *G06F 9/5005* (2013.01); *G06F 11/3604* (2013.01); *G06N 20/00* (2019.01)

(58) Field of Classification Search
CPC ........ G06F 8/10; G06F 8/60–71; G06F 8/437; G06F 11/3604; G06F 9/50; G06F 9/5005; G06N 20/00
See application file for complete search history.

(56) References Cited

U.S. PATENT DOCUMENTS 9,800,466 B1 * 10/2017 Rangole .............. G06F 11/3452
2019/0068445 A1 * 2/2019 Chauhan ................ H04L 67/10
(Continued)

FOREIGN PATENT DOCUMENTS

WO    WO-2015063831 A1 *    5/2015    ............... G06F 8/30

OTHER PUBLICATIONS

Wen, Jinfeng, et al., An empirical study on challenges of application development in serverless computing, Proceedings of ESEC/FSE, 2021, 13 pages, [retrieved on Sep. 25, 2023], Retrieved from the Internet: <URL:http://dl.acm.org/>.*

(Continued)

*Primary Examiner* — Geoffrey R St Leger
(74) *Attorney, Agent, or Firm* — Harrity & Harrity, LLP

(57) ABSTRACT

In some implementations, a device may generate, based at least in part on a first set of inputs, a serverless software development environment associated with a set of cloud resources. The device may generate, based at least in part on a first machine learning model, a technology stack recommendation having a set of associated tools for performing a software development task. The device may instantiate the selected technology stack in the serverless software development environment and generate a set of applications based (Continued)

at least in part on executing the set of tools. The device may deploy the set of applications in one or more serverless application environments. The device may use machine learning to observe deployed applications, detect hidden anomalies, and perform root-cause analysis, thereby providing a lean and sustainable serverless environment.

20 Claims, 20 Drawing Sheets

(51) Int. Cl.
    *G06F 8/41*     (2018.01)
    *G06F 8/71*     (2018.01)
    *G06F 9/50*     (2006.01)
    *G06N 20/00*     (2019.01)

(56) References Cited

U.S. PATENT DOCUMENTS

2020/0004591 A1*   1/2020   Das ..................... H04L 67/1031
2020/0218634 A1*   7/2020   Jones ........................ G06F 8/43
2021/0099459 A1*   4/2021   Zhang .................. H04L 63/104

OTHER PUBLICATIONS

Serverless computing, Wikipedia, 2022, 7 pages, [retrieved on Sep. 25, 2023], Retrieved from the Internet: <URL:https://web.archive.org/web/20220317014004/https://en.wikipedia.org/wiki/Serverless_computing/>.*

* cited by examiner

SERVERLESS ENVIRONMENT-BASED PROVISIONING AND DEPLOYMENT SYSTEM

BACKGROUND

The evolution of technology has generated a need to accelerate software delivery. Software development and information-technology operations (DevOps) aims to shorten a software development life cycle and provide continuous delivery of high quality software.

SUMMARY

Some implementations described herein relate to a method. The method may include generating, by a device and based at least in part on a first set of inputs, a serverless software development environment associated with a set of cloud resources. The method may include generating, by the device and based at least in part on a first machine learning model, a technology stack recommendation that indicates at least one suggested technology stack based at least in part on at least one technology identified by a second set of inputs. The method may include generating, by the device, a set of tools associated with a selected technology stack, wherein the selected technology stack is based at least in part on a customization of the at least one suggested technology stack, and wherein a tool of the set of tools is configured to perform a software development task. The method may include instantiating, by the device, the selected technology stack in the serverless software development environment. The method may include generating, by the device, a set of applications based at least in part on executing the set of tools. The method may include deploying, by the device, the set of applications in one or more serverless application environments.

Some implementations described herein relate to a device. The device may include one or more memories and one or more processors coupled to the one or more memories. The device may be configured to generate a serverless software development environment associated with a set of cloud resources. The device may be configured to generate a set of tools associated with a selected technology stack of at least one suggested technology stack, wherein the selected technology stack is based at least in part on a customization of the at least one suggested technology stack, wherein the at least one suggested technology stack is based at least in part on a first machine learning model, and wherein a tool of the set of tools is configured to perform a software development task. The device may be configured to instantiate the selected technology stack in the serverless software development environment. The device may be configured to generate, by the device, a set of applications based at least in part on executing the set of tools. The device may be configured to deploy, by the device, the set of applications in one or more serverless application environments. The device may be configured to delete, by the device, the serverless software development environment based at least in part on receiving a user input instructing deletion of the serverless software development environment.

Some implementations described herein relate to a non-transitory computer-readable medium that stores a set of instructions for a device. The set of instructions, when executed by one or more processors of the device, may cause the device to generate, based at least in part on a first set of inputs, a serverless software development environment associated with a set of cloud resources. The set of instructions, when executed by one or more processors of the device, may cause the device to generate, using the serverless software development environment, a set of applications based at least in part on executing a set of tools associated with a selected technology stack of at least one suggested technology stack, wherein the selected technology stack is based at least in part on a customization of the at least one suggested technology stack, wherein the at least one suggested technology stack is based at least in part on a first machine learning model, and wherein a tool of the set of tools is configured to perform a software development task. The set of instructions, when executed by one or more processors of the device, may cause the device to deploy the set of applications in one or more serverless application environments. The set of instructions, when executed by one or more processors of the device, may cause the device to determine, based at least in part on a second machine learning model, feedback information associated with performance of at least one application of the set of applications. The set of instructions, when executed by one or more processors of the device, may cause the device to perform a mitigation task based at least in part on the feedback information.

DETAILED DESCRIPTION

Figure 1A:
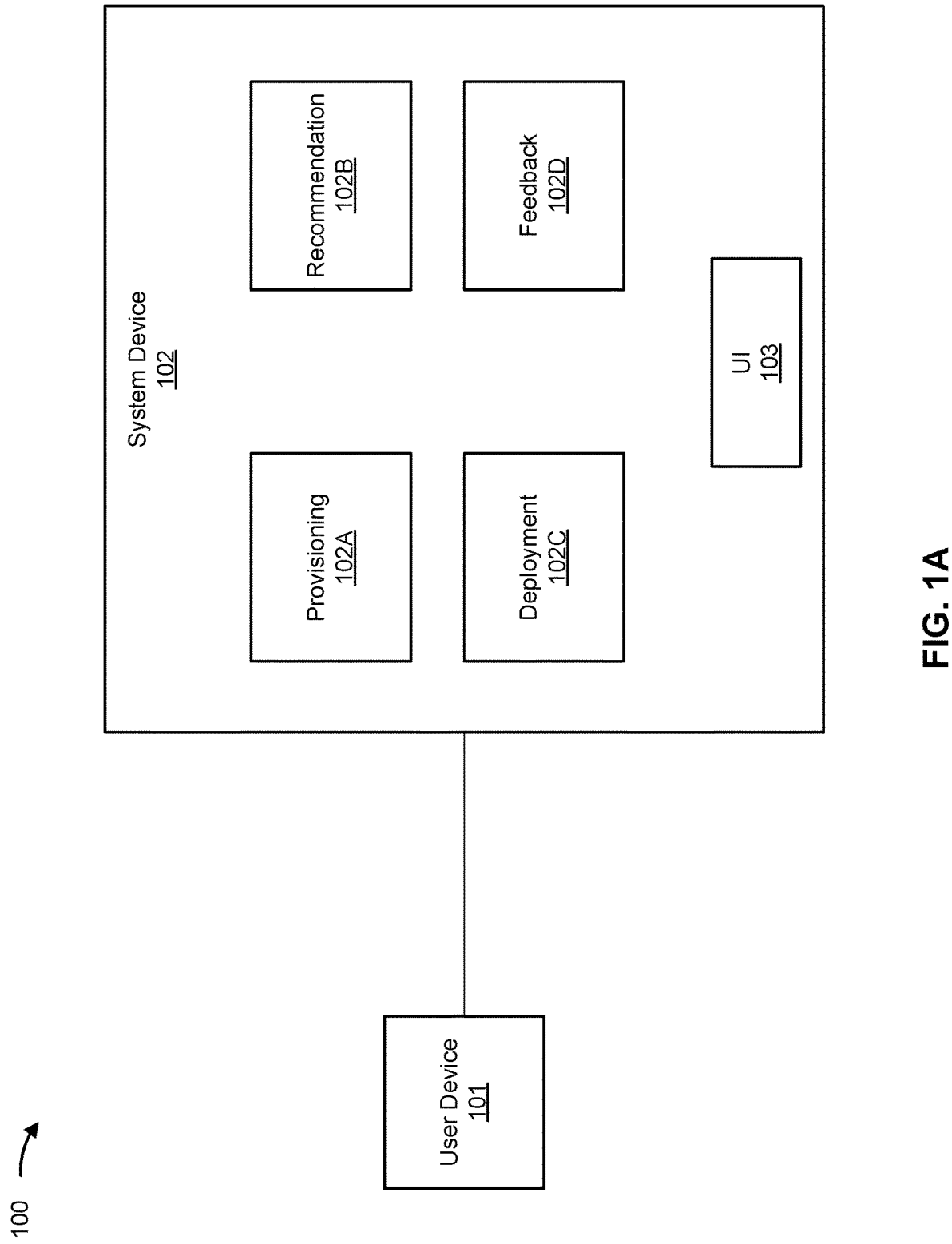
FIGS. 1A-1P are diagrams of an example implementation described herein.

The following detailed description of example implementations refers to the accompanying drawings. The same reference numbers in different drawings may identify the same or similar elements.

To optimize memory utilization, speed to market, and cost, today's businesses leverage cloud computing to facilitate software development and information technology operations (DevOps) for automated application deployment and/or infrastructure provisioning. However, improper provisioning and poor application architecture design can lead to cloud sprawl caused by uncontrolled resource allocation and utilization. Additionally, resource capacity may vary based on the scale of the business. Misaligned resource capacity and mismanagement of resource idle time can incur exorbitant cloud expenses for a business.

DevOps adoption on the cloud is often used by large-scale businesses with frequent application deployments to facilitate moving deployments to market quickly. However, even for projects that employ high-frequency deployment practices, there is often a cost associated with the idle time between two deployments, and businesses often end up paying for more than the required utilization of cloud and server resources (e.g., memory and computing resources). Likewise, for small-scale businesses with un-customized deployments, running clusters on the cloud for an entire day or for scheduled periods might push businesses to pay more than is actually required to accomplish its cloud deployments. Traditionally, for any provisioning or deployment activity, the entire pipeline and/or tools setup will be in running a state from the start till the end of the execution or for a manually defined time. Thus, costs often are incurred (in terms of memory consumption, resource usage, and processing power) during in-between intervals in which the pipelines and/or tools are not actively being used.

Some implementations described herein enable serverless application development and deployment. A serverless environment-based provisioning and deployment system is described herein. The serverless environment-based provisioning and deployment system includes a provisioning engine that facilitates dynamic provisioning of serverless resources for developing applications, a recommendation engine that includes a machine learning model to provide recommendations of technology stacks (sets of tools) to be used to generate applications, a deployment engine that facilitates deployment of generated applications in one or more serverless environments, and an analytics engine that may be used to optimize performance of the provisioning and deployment system and/or the deployed applications. The components of the system are generated dynamically as needed and then deleted upon completion of associated tasks. As a result, resources and tools that are used in the development and/or deployment of applications only consume memory and processing power when they are actively being used. Additionally, automation of technology stack recommendations, tool generation, and application generation may minimize the amount of user interaction with the system, thereby reducing the potential for user induced errors and increasing the speed at which applications can be developed and deployed. Moreover, the dynamic and automated nature of the pipeline and tool generation described herein may facilitate ease of scalability.

In some cases, adoption of serverless environments can result in inadequate monitoring and logging, increased cost in handling complex multi-cloud serverless deployment architectures, and limited (or no) visibility into the parameters that consume memory in serverless deployments, which may increase the cost and/or lead to security issues or threats. Some implementations described herein address these challenges by providing for increased observability. For example, applications deployed across serverless environments may be observed and machine learning may facilitate identifying applications and/or aspects of the applications that are influential in increased memory consumption and/or processing power consumption. Machine learning models may be used to generate alerts and insights associated with the observation, which may facilitate reduction in costs as well as increased security. Root-cause analysis also may be provided using machine learning, thereby facilitating more efficient solutions to problematic issues in deployment.

Figure 1B:
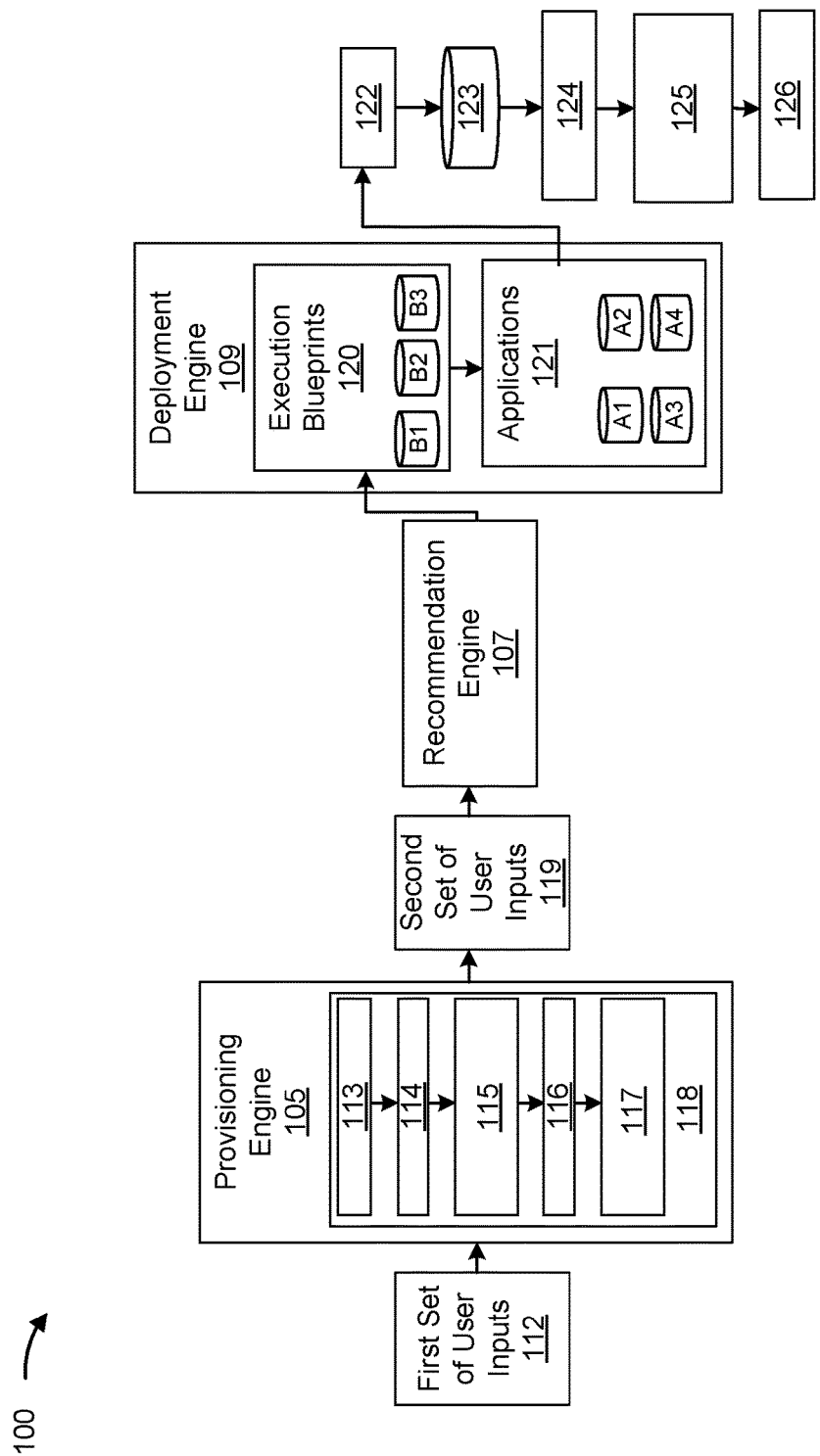
Figure 1C:
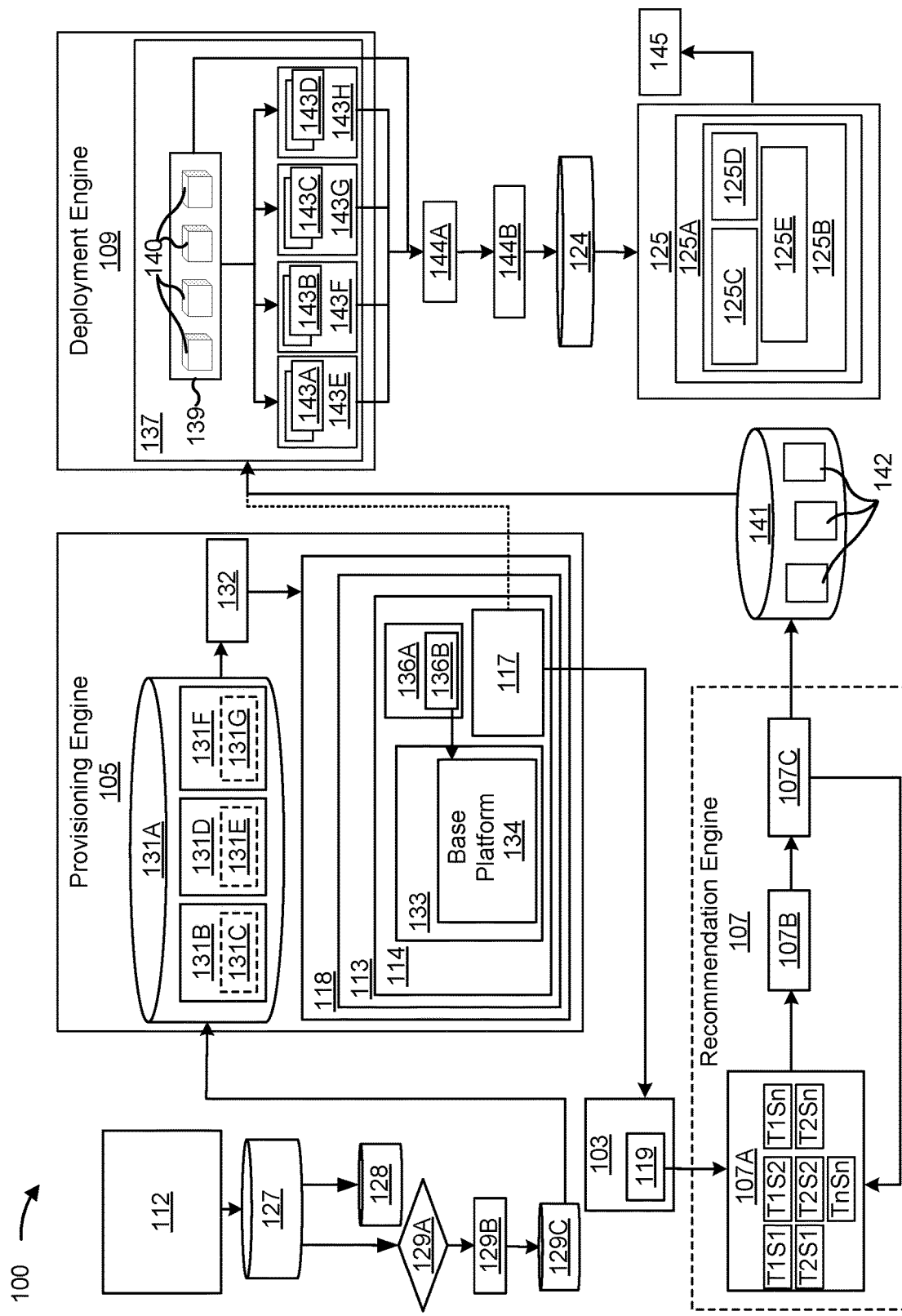
Figure 1D:
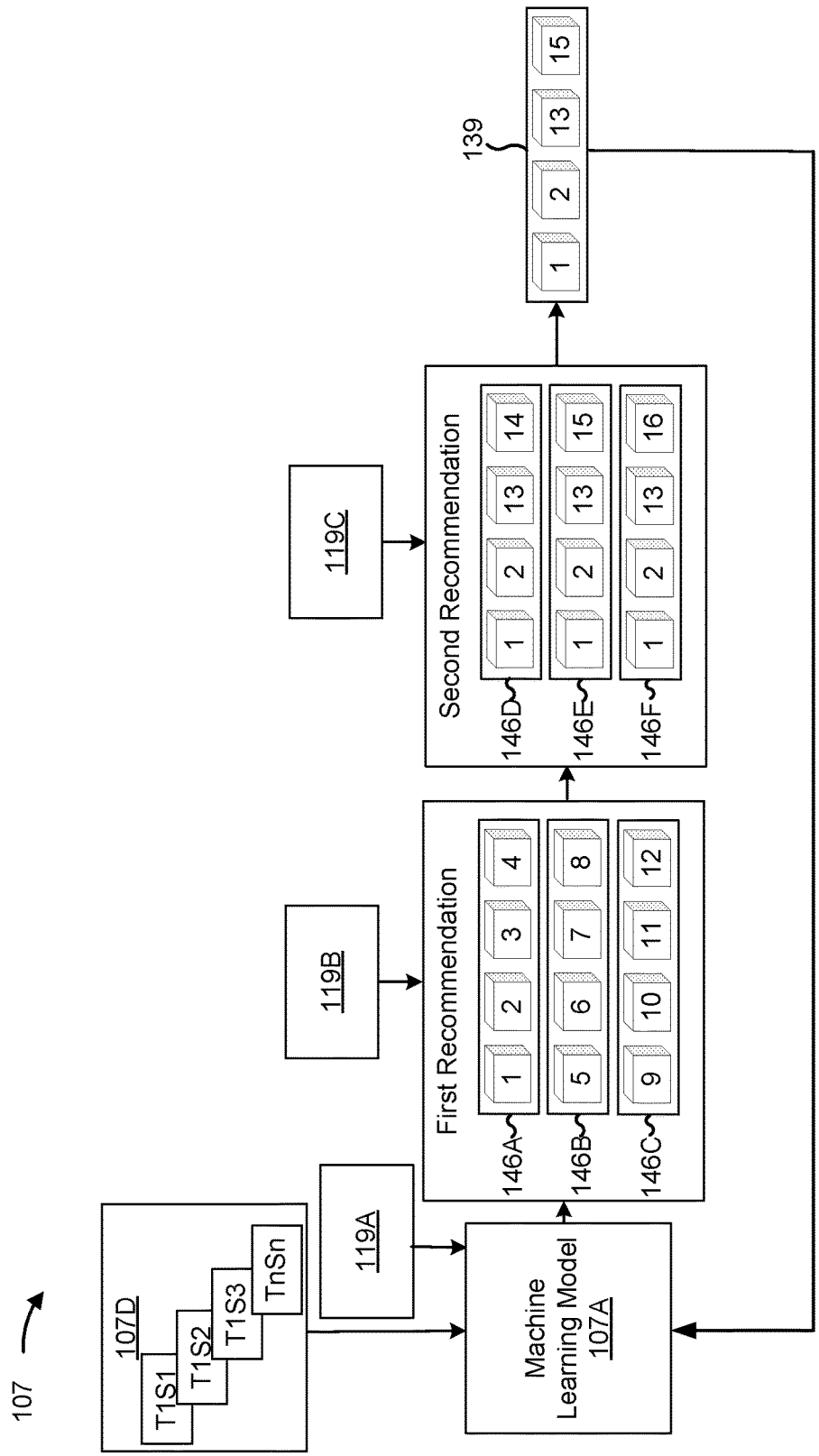
Figure 1E:
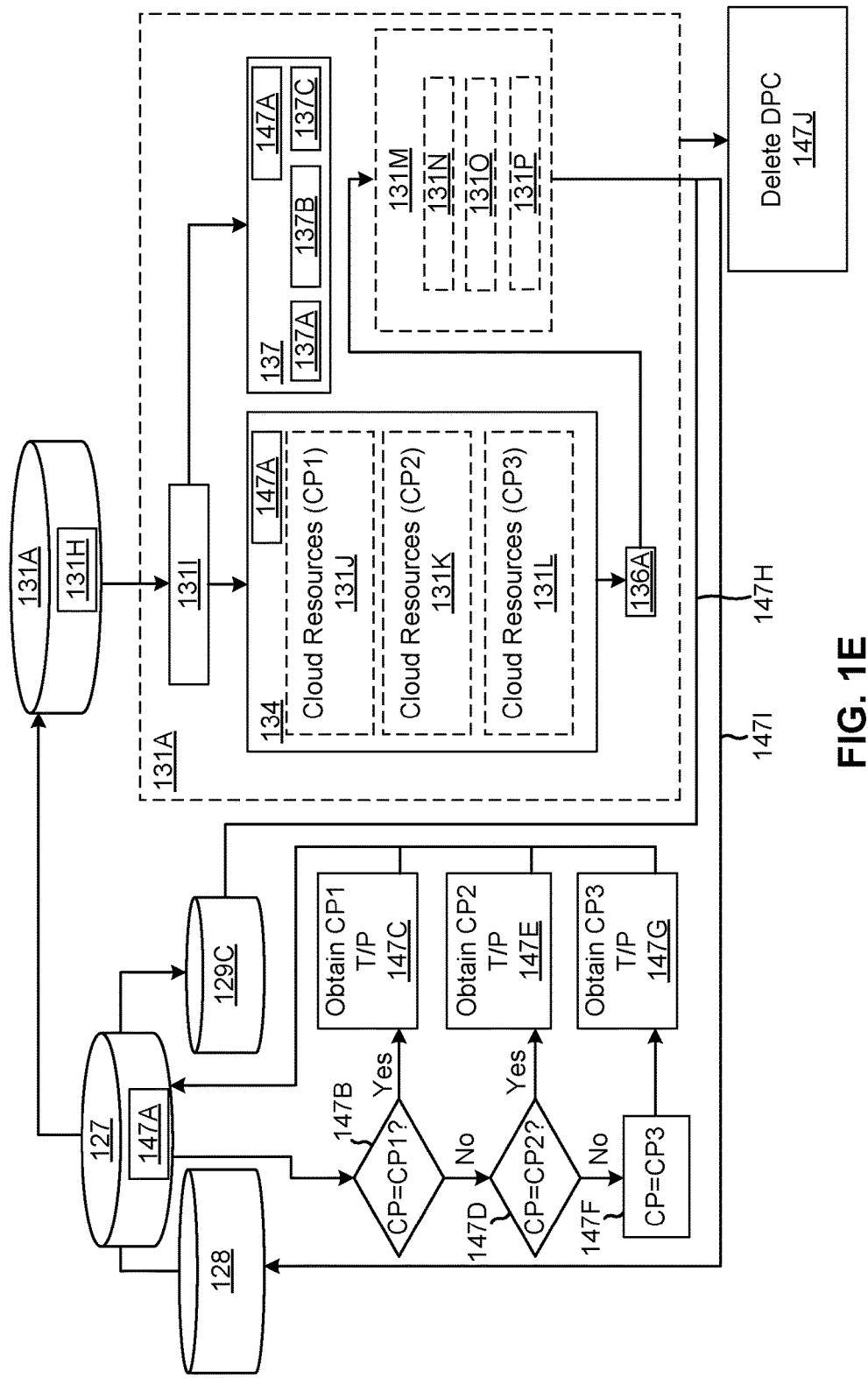
Figure 1F:
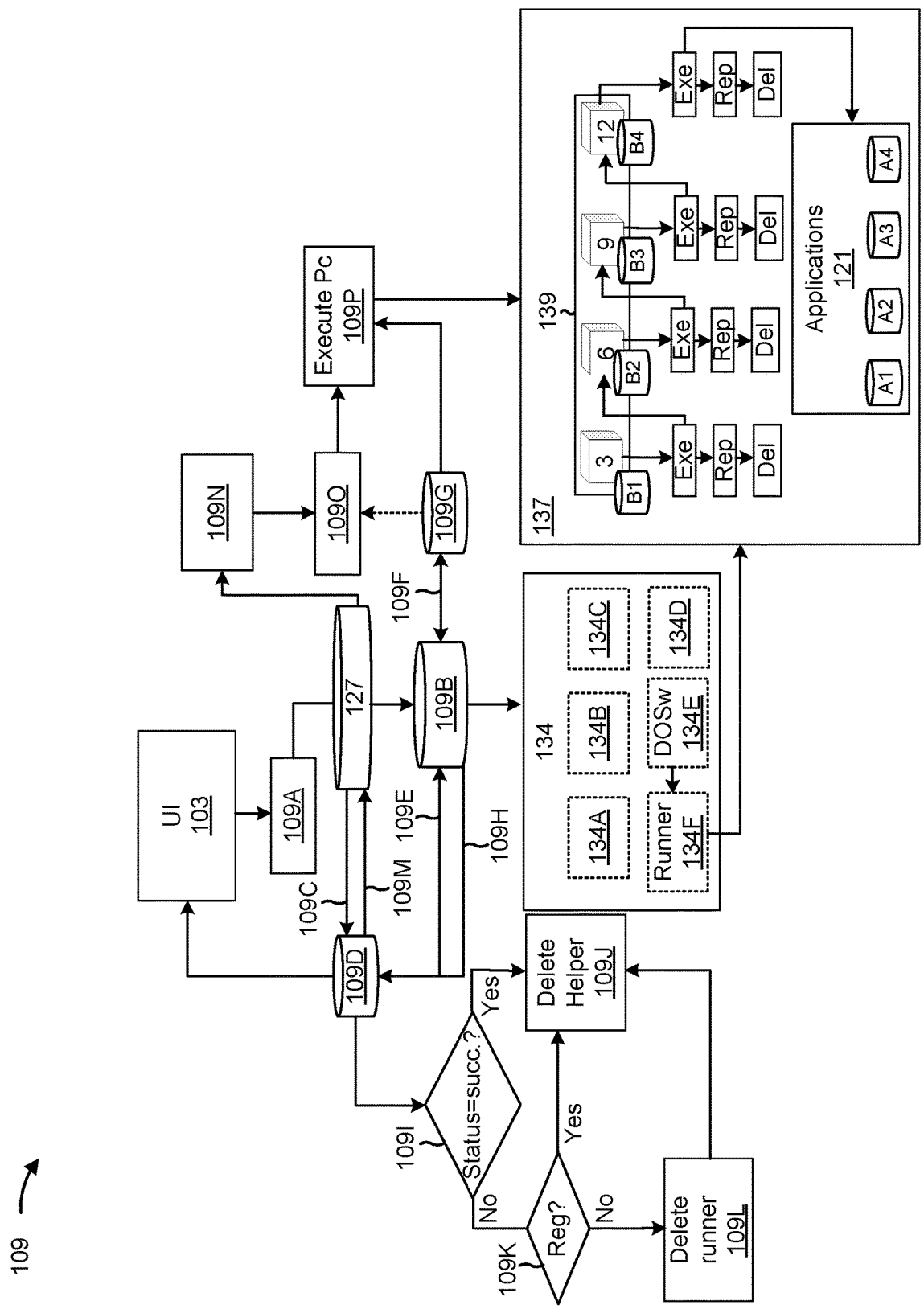
Figure 1G:
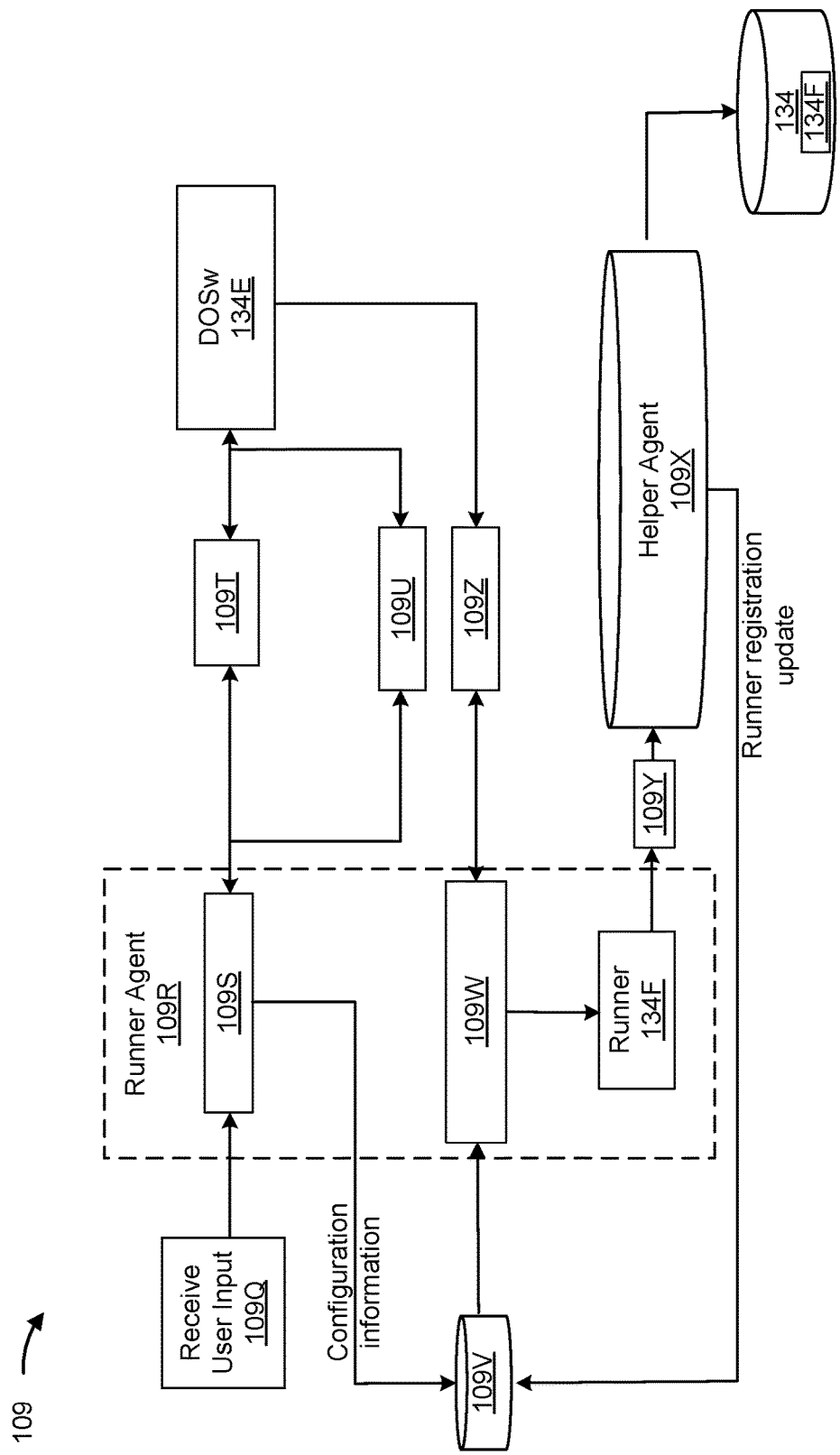
Figure 1H:
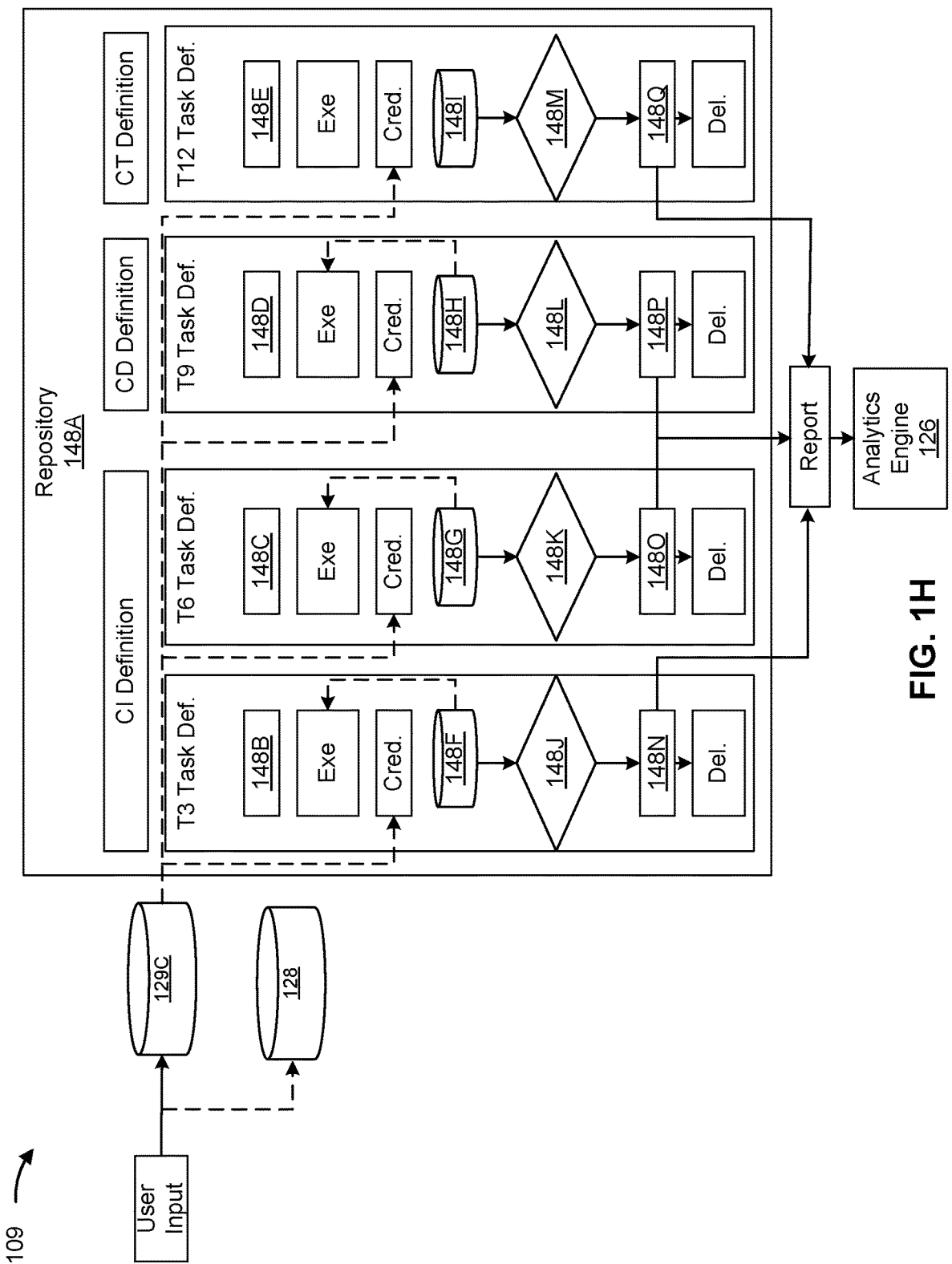
Figure 1I:
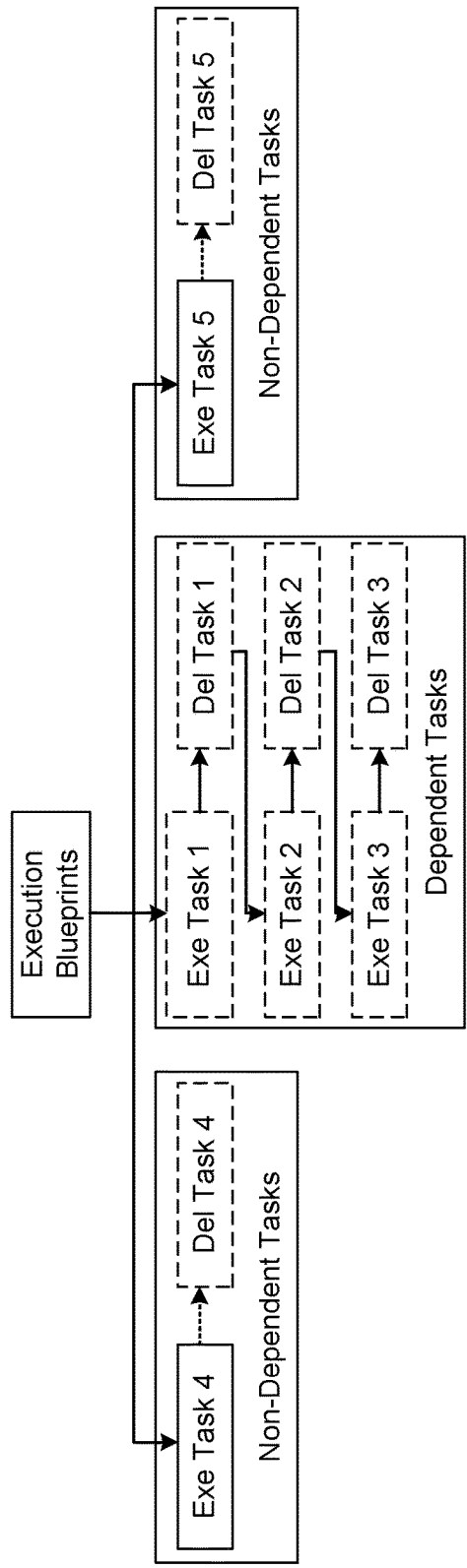
Figure 1J:
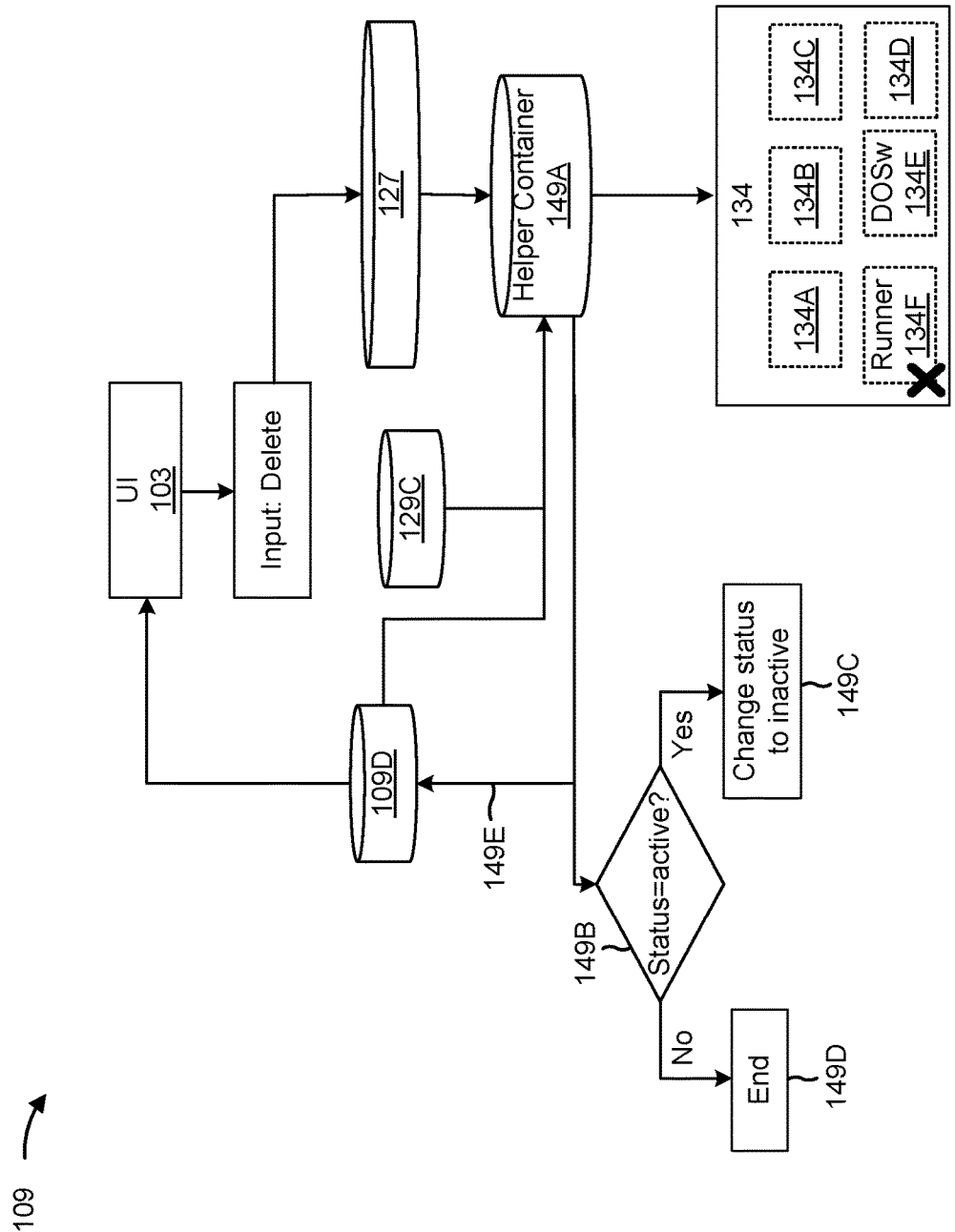
Figure 1K:
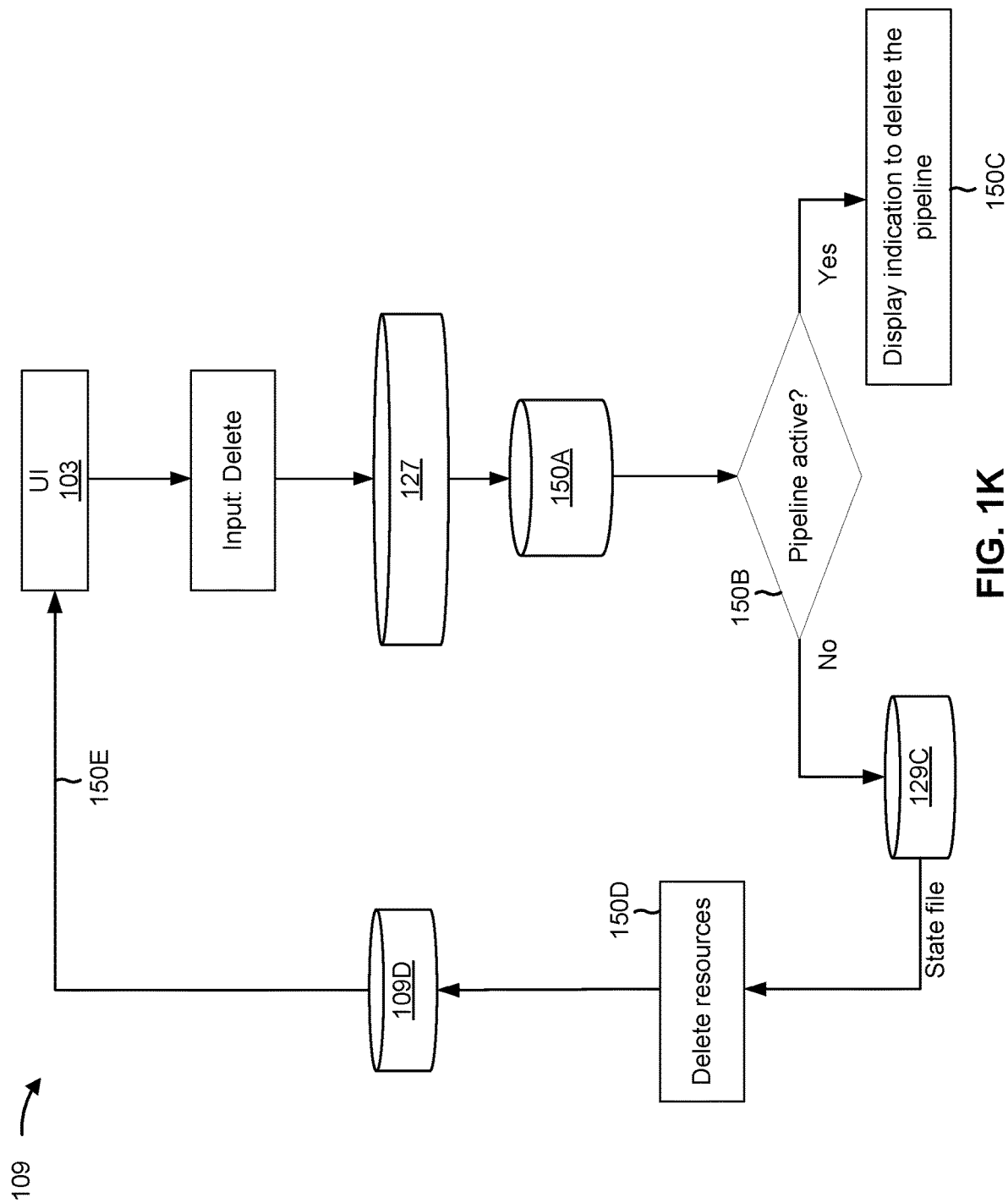
Figure 1L:
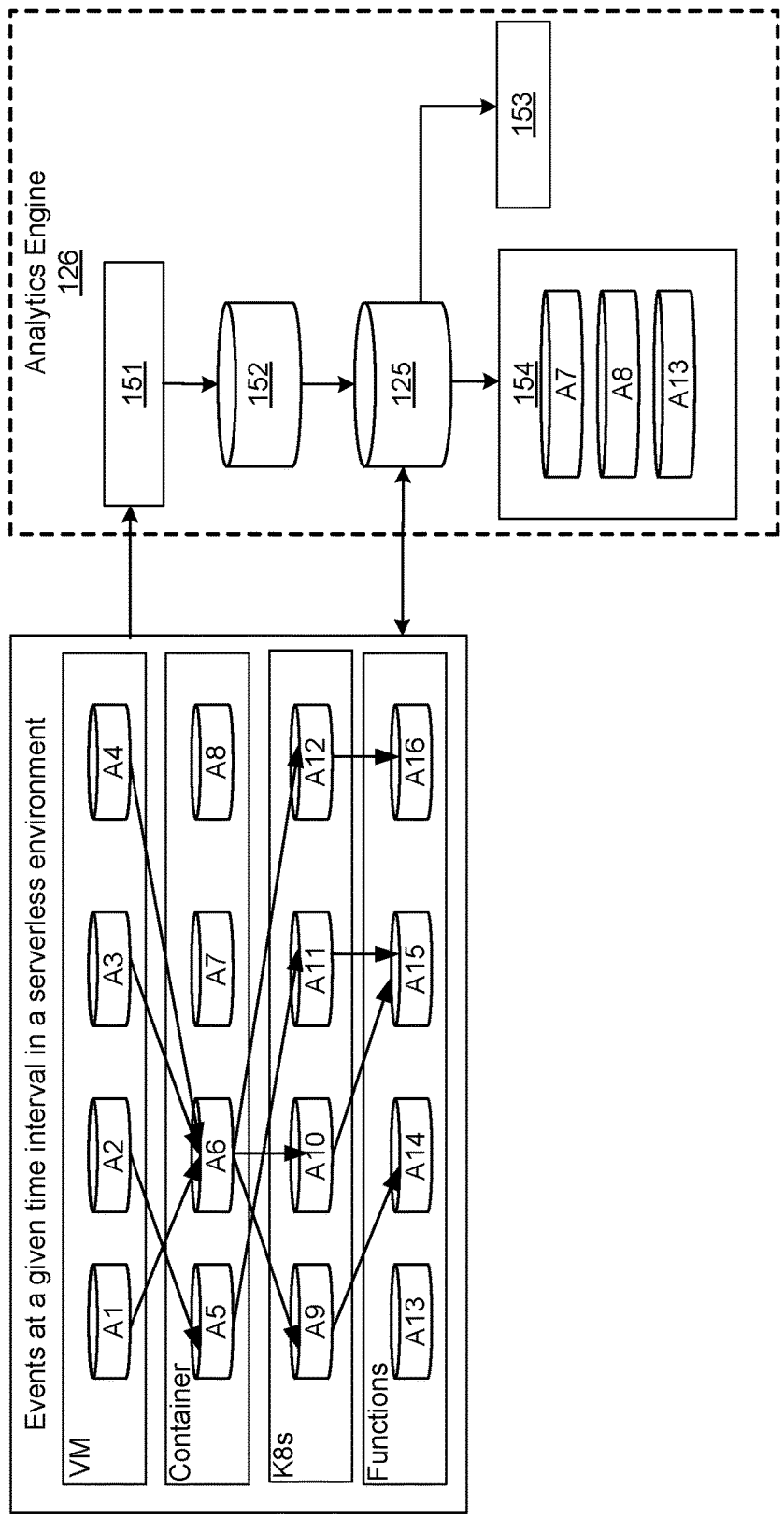
Figure 1M:
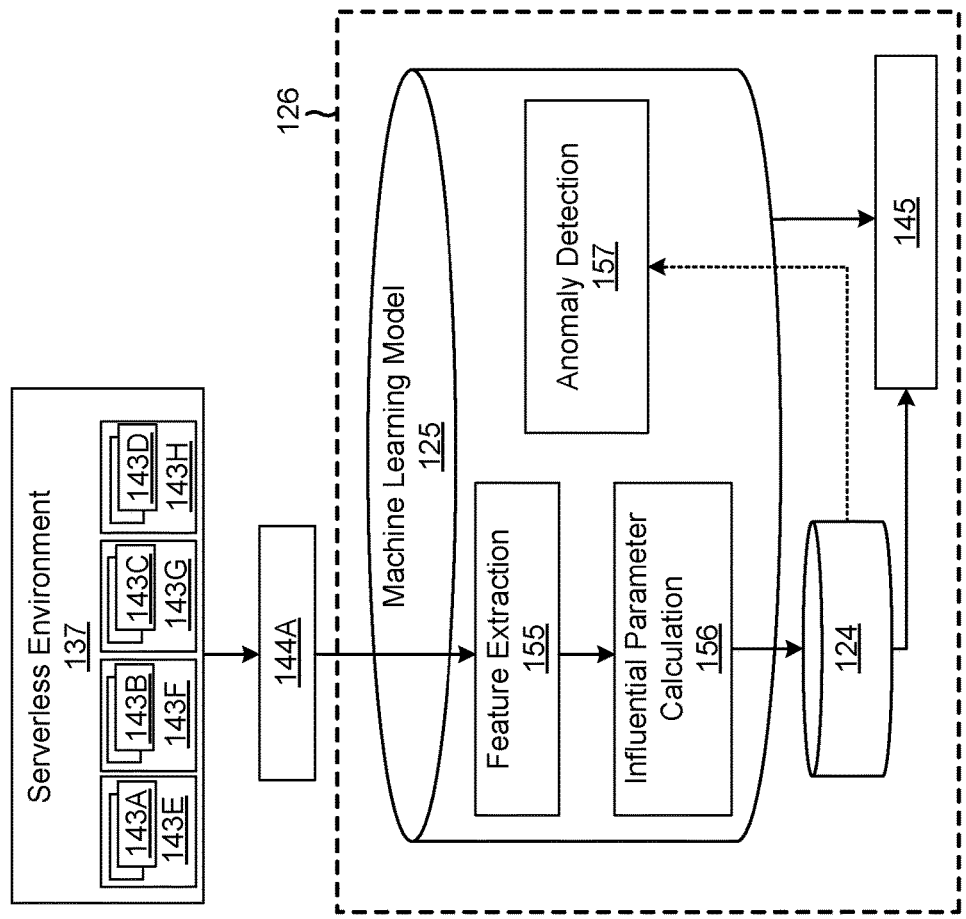
Figure 1N:
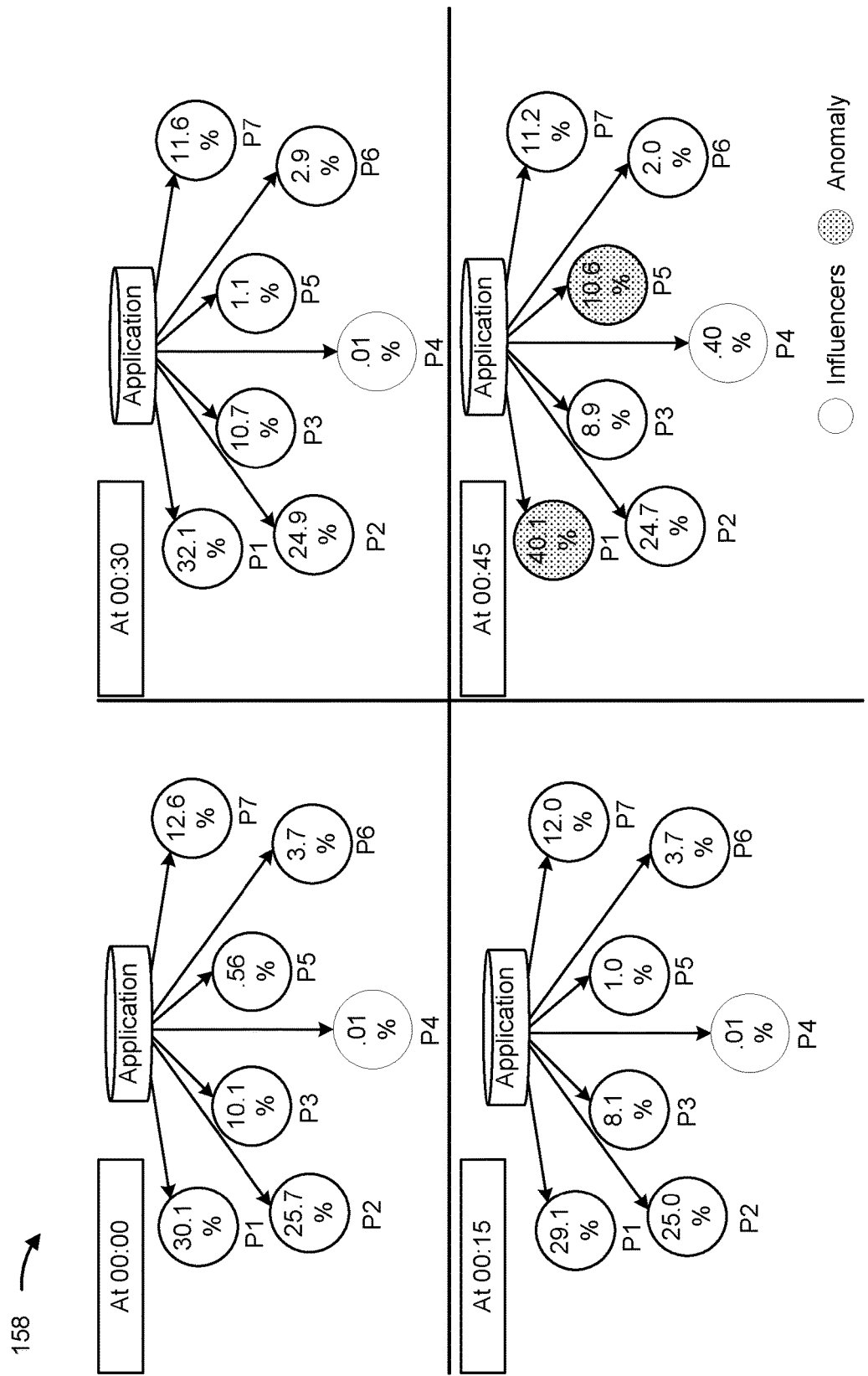
Figure 10:
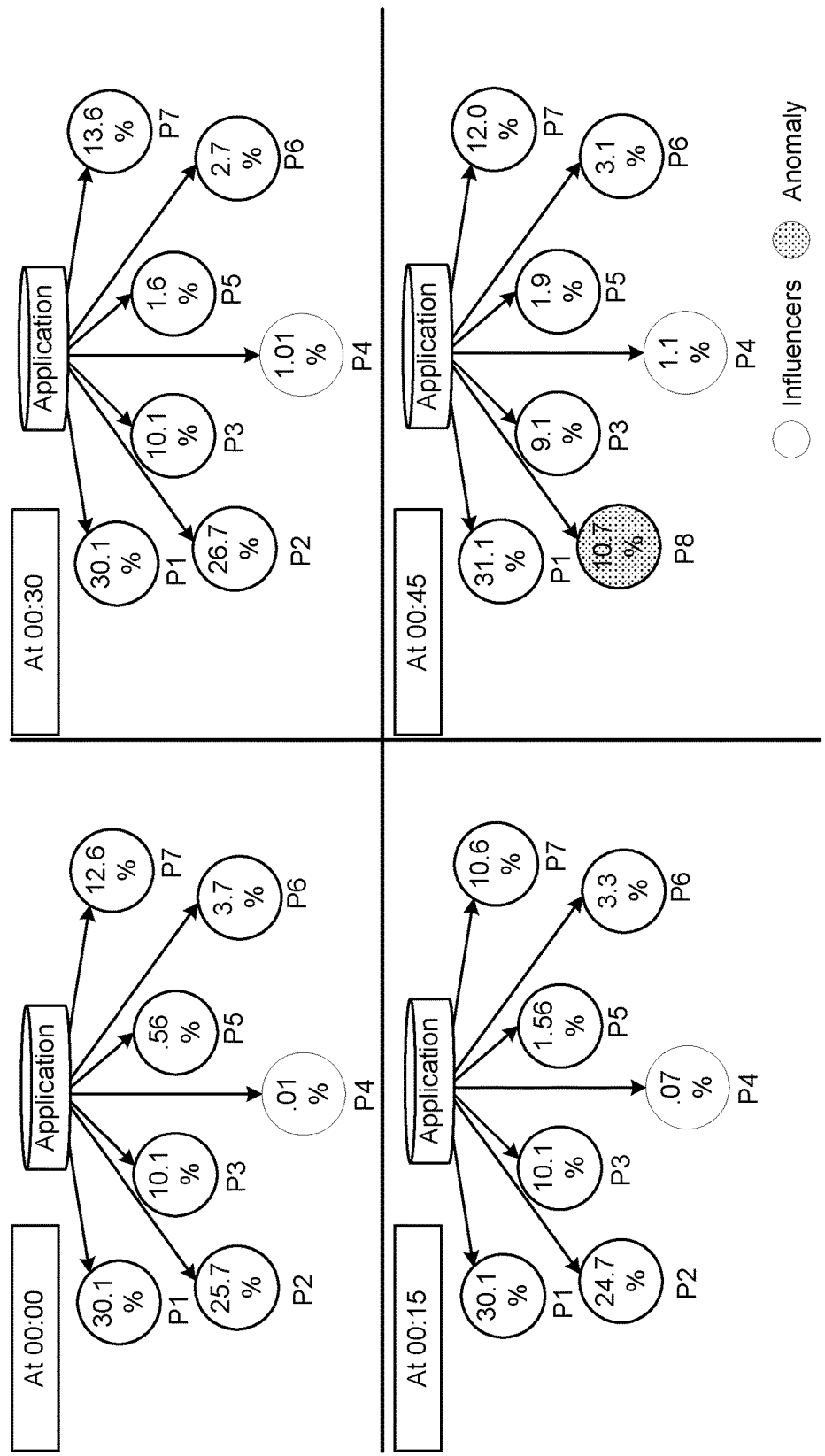
Figure 1P:
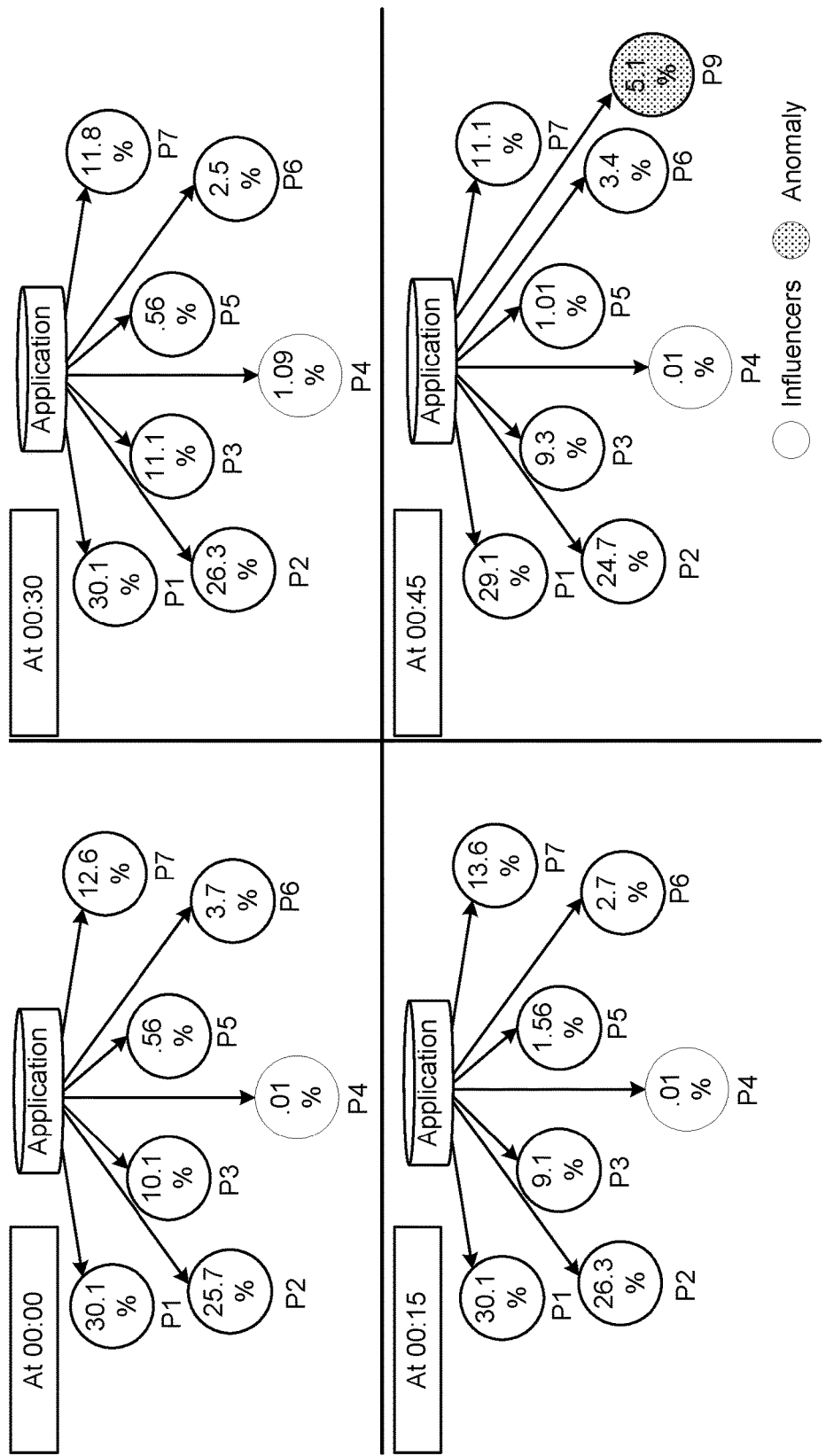

FIGS. 1A-1P are diagrams of an example implementation 100 associated with a serverless environment-based provisioning and deployment system. As shown in FIGS. 1A-1P, example implementation 100 includes a user device 101 and a system device 102. These devices are described in more detail below in connection with FIG. 3 and FIG. 4.

As shown in FIG. 1A, the user device 101 may communicate with the system device 102 to access services associated with the serverless environment-based provisioning and deployment system, which is hosted by the system device 102. The system device 102 may be one device or multiple devices and may provide one or more aspects of the serverless environment-based provisioning and deployment system. The system device 102 may provide a user interface ("UI") 103 that may facilitate interaction with a user of the user device 101. For example, the UI 103 may provide, for display at the user device 101, a development dashboard that may provide information and/or receive user inputs.

The user device 101 may a first set of user inputs and provide a first set of user inputs to the serverless environment-based provisioning and deployment system via the UI 103. The first set of user inputs may include one or more user inputs. The one or more user inputs may include one or more options, parameters, and/or values provided by a user, or selections of presented options and/or one or more parameter values, among other examples. For example, the first set of user inputs may include inputs that cause instantiation of a DevOps session associated with the serverless environment-based provisioning and deployment system.

Based at least in part on the first set of inputs, the system device 102 may perform a provisioning process 102A. The provisioning process 102A may be performed, for example, by a provisioning engine 105, depicted in FIG. 1B. Using the provisioning engine 105, the system device 102 may generate a serverless software development environment associated with a set of cloud resources. For example, the provisioning engine 105 may dynamically and automatically create the set of cloud resources, servers, and/or tools layer that the system device 102 may use to instantiate a development platform as described herein.

The system device 102 may perform a recommendation process 102B. The recommendation process 102B may be performed, for example, by a recommendation engine 107, depicted in FIG. 1B. The recommendation engine 107 may, for example, generate, based at least in part on a first machine learning model, a technology stack recommendation. The technology stack recommendation may indicate at least one suggested technology stack based at least in part on at least one technology identified by a second set of inputs (e.g., a second set of user inputs). The second set of user inputs may be received via the UI 103. A technology stack is a set of one or more technologies (e.g., pieces of code, functions, applications, application programming interfaces (APIs), etc.). The at least one suggested technology stack may be customized based on the second set of user inputs, which may define one or more parameters or other aspects of a DevOps procedure to be performed. The recommendation engine 107 may generate the at least one technology stack based at least in part on a machine learning model. For example, the machine learning model may be configured to receive information about one or more prior DevOps procedures and the second set of user inputs and to output a recommendation of at least one technology stack to be used to perform the DevOps procedure.

The user of the user device 101 may select, via the UI 103, at least one suggested technology stack. For example, in some aspects, the selected technology stack may include a selection of one or more components (e.g., technologies) of one or more suggested technology stacks. The selected technology stack may include one of the suggested technology stacks, a technology stack that was not suggested, and/or a combination thereof. Thus, the second set of user inputs may be used to customize the at least one suggested technology stack, and the selected technology stack may be based at least in part on the customization of the at least one suggested technology stack. The selection may be provided to the machine learning model to facilitate further training thereof to improve the contextual relevance of the suggestions made in the recommendation process 102B.

The system device 102 may perform a deployment process 102C to deploy applications. The deployment process 102C may be performed using a deployment engine 109, depicted in FIG. 1B. To facilitate deploying applications, the system device 102 may generate a set of tools associated with a selected technology stack. For example, the system device 102 may use an automated code generation module to generate a set of tools associated with a selected technology stack. For example, the automated code generation module may perform an automated code generation process. The automated code generation process may be performed using any number of code generation protocols such as, for example, pipeline as a code, infrastructure as a code, and/or compliance as a code, among other examples. The automatically-generated tools may include, for example a tool that is configured to perform a software development task.

To generate one or more applications, the system device 102 may generate the one or more applications, for example, by executing the automatically-generated tools. For example, the system device 102 may execute one or more tools based at least in part on an execution blueprint. The execution blueprint is a set of information associated with execution of one or more tools and/or applications. For example, the execution blueprint may indicate an order in which to executed one or more tools and/or applications, dependencies for triggering execution of the one or more tools and/or applications, parameters to be used in execution procedures, and/or other specifications regarding execution of the one or more tools and/or applications. In some aspects, to reduce unnecessary memory and/or processing burdens, the system device may destroy the one or more executed tools based at least in part on a determination that the software development task is completed.

The system device 102 may, using the deployment engine 109, deploy, by the device, the set of applications in one or more serverless application environments. Some aspects of the system described herein also may provide feedback services for improving applications, reduce memory and/or processing resource consumption by applications, and/or mitigate any number of other issues arising during the deployment of one or more applications in the serverless environment. For example, the system device 102 may perform a feedback process 102D. The system device 102 may implement one or more machine learning models for facilitating intelligent feedback, recommendations for improvements, and/or identification of anomalies (e.g., applications or processes consuming excessive amounts of memory and/or processing resources), among other examples. For example, the system device 102 may use semantic networks for issue prediction, machine learning models for memory optimization, anomaly detection, and recommendations based on root cause analysis.

Some implementations of the serverless environment-based provisioning and deployment system described herein may facilitate cost-efficient application deployment in which users may deploy an application in any cloud environment (associated with any cloud provider) with minimal operational cost as a result of building applications using execution blueprints that optimize cost and resource consumption and/or as a result of the use of intelligent and dynamic destruction of tools, applications, and/or processes that are no longer being used. Some implementations of the serverless environment-based provisioning and deployment system provide a flexible solution that may be implemented for any scale of business and with any frequency of deployments. The dynamic execution and destruction of tools and/or applications facilitated by implementations described herein may facilitate optimization of costs, processing burdens, and/or financial burdens, among other examples.

FIG. 1B illustrates a functional flow associated with implementations of the serverless environment-based provisioning and deployment system. As shown in FIG. 1B, a user of the system (e.g., a user of the user device 101) may provide a first set of user inputs 112, via the user interface 103, to the system (e.g., the system device 102) for serverless resource creation. This first set 112 of user inputs may be provided to the provisioning engine 105. Based on the first set 112 of user inputs, the provisioning engine 105 may interact with a network layer 113 to dynamically generate cloud resources 114, virtual servers 115, and a tools layer 116 that instantiates the serverless development platform as a serverless resource 117. As shown, the provisioning engine 105 may generate the cloud resources 114, the virtual servers 115, the tools layer 116 and the serverless resource 117 on a cloud 118. The cloud 118 may include one or more cloud environments provided by one or more cloud providers.

As shown in FIG. 1B, the user may provide a second set 119 of user inputs (e.g., via the user interface 103) that may be provided to the recommendation engine 107 for facilitating generation of the technology stack recommendation. The second set of user inputs may include inputs received before generation of the technology stack recommendation. The user inputs received before generation of the technology stack recommendation may be used, by the recommendation engine 107 to generate the technology stack recommendation. In some implementations, the recommendation engine 107 may also use one or more of the user inputs of the first set 112 of user inputs to facilitate generation of the technology stack recommendation.

The second set 119 of user inputs may include user inputs received after generation of the technology stack recommendation. For example, in some implementations, the recommendation engine may use a machine learning model to generate, based at least in part on one or more of the first or second sets 112 or 119 of user inputs to generate a recommendation of a technology stack (e.g., a suggested technology stack). The suggested technology stack may include a recommendation of a set of software development tools that may be used to perform a DevOps procedure indicated by one or more of the user inputs of the first or second sets 112 or 119 of user inputs. The user may, via the second set 119 of user inputs, select a suggested technology stack and, in some implementations, may provide inputs to customize one or more aspects of the selected technology stack. This process may repeat any number of times during which the recommendation engine 107 may, for example, generate recommendations of further technology stacks based at least in part on selections and/or customizations by the user. In this way, the intelligence embedded in the recommendation engine may provide a customizable and efficient selection of tools. Because machine learning may be employed to facilitate the technology stack recommendations, improvements in the quality (e.g., relevance to the user) of the recommendations may improve over time as the machine learning model may be dynamically and continually trained using operational data.

The recommendation engine may generate a selected technology stack based at least in part on the customization, by the user, of one or more suggested technology stacks, and provide an indication of the selected technology stack to the deployment engine 109. The deployment engine 109 may generate the set of tools indicated in the selected technology stack. The deployment engine 109 may generate the tools using an automated code-generation process. For example, in some implementations, the deployment engine 109 may fetch code-generating protocol modules such as, for example, pipeline as a code, infrastructure as a code and/or compliance as a code, among other examples. The deployment engine 109 may generate a set 120 of execution blueprints (shown as "A1, A2, and A3"). Each execution blueprint of the set 120 of execution blueprints may include a set of tasks or activities configured to generate one or more tools, execute the one or more tools, automatically destroy the one or more tools, and trigger a following task or activity.

Execution of the one or more tools of the selected technology stack, in accordance with the execution blueprints, may facilitate generation of a set 121 of applications. The deployment engine 109 may deploy the applications in the newly-created serverless resource 117. A set 122 of logs (e.g., logged data) may be stored in a data lake 123, which may be a repository for storing information about any one or more of the operations of the system. For example, in some aspects, logged information associated with the generation of the tools, the details of the execution blueprints, the generation of the applications, and/or the deployment of the applications may be stored in the data lake 123. Logs stored in the data lake 123 may be provided to a databased 124 associated with a machine learning model 125 that may be used to facilitate implementation of any number of machine learning models for performing an analytics function using an analytics engine 126 associated with application deployment. For example, in some implementations, the system device 102, using the machine learning model 125, may determine feedback information associated with performance of at least one application of the set 121 of applications and may perform a mitigation task based at least in part on the feedback information. The logs stored in the data lake 123 may be used for data lineage that may be used as input data for training machine learning models implemented by the machine learning model 125. The machine learning models may assist in faster error debugging, error identification, memory optimization, and/or quality checks on the platform.

FIG. 1C illustrates an example of a technical flow associated with a serverless environment-based provisioning and deployment system. As shown, the first set 112 of user inputs are provided to the serverless environment-based provisioning and deployment system. The first set 112 of user inputs may include, for example, identification of a cloud provider, a resource name, a resource description, cloud credentials, and/or a region identifier associated with the user device 101, among other examples. Based at least in part on receiving the first set 112 of user inputs, the system device 102 may instantiate an application programming interface (API) orchestrator agent (referred to herein as an "orchestrator agent") 127. The orchestrator agent 127 can be an API configured to orchestrate (e.g., organize and control) one or more operations of one or more other entities, containers, objects, application components, and/or other components of the system 100. The orchestrator agent 127 may be configured to perform orchestration tasks autonomously based at least in part on parameters specified by user input and/or input from a data store or other system component 127. The orchestrator agent 127 may be instantiated in any number of different roles within the development system described herein. Accordingly, reference to the orchestrator agent 127 may include reference to a particular instance of the orchestrator agent 127. For example, the orchestrator agent 127 may be instantiated as an agent in the overall system, as an agent (controller) within the provisioning engine 105, and/or as an agent within the deployment engine 109, among other examples.

The orchestrator agent 127 may instantiate the provisioning engine 105 and the deployment engine 109. The orchestrator agent 127 store the set 112 of user input in a database 128 and may call a validation process 129A to validate the cloud credentials. The validated cloud credentials may be encrypted in an encryption process 129B and the encrypted credentials may be stored in a credential vault 129C. Credential vault 129C may be a data store configured to store credential information for users and/or devices associated with a serverless environment-based provisioning and deployment system. The orchestrator agent 127 may retrieve one or more user inputs from the database 128 and provide the one or more user inputs and the encrypted credentials to a dynamic provision container 131A that is configured to be controlled by the orchestrator agent 127. The dynamic provision container 131A may be a dynamically generated isolated container that may be configured to perform one or more specified tasks at the direction of the orchestrator agent 127. The dynamic provision container 131A may, under the control of the orchestrator agent 127, generate the cloud resources 114 based at least in part on the encrypted credentials that the dynamic provision container 131A may receive from the credential vault 129C. The cloud resources 114 may include cloud memory resources and/or cloud computing resources. The dynamic provision container 131A may, for example, generate a first cloud resource 131B associated with a first cloud provider and using a first cloud credential 131C, a second cloud resource 131D associated with a second cloud provider and using a second cloud credential 131E, and/or a third cloud resource 131F associated with a third cloud provider and using a third cloud credential 131G. The provisioning engine 105 may obtain a set of cloud-specific templates from the dynamic provision container to generate a golden copy 132 of a cloud resource template. The golden copy 132 may be a comprehensive cloud template that may be used to generate one or more cloud resources 114. For example, in some implementations, the golden copy 132 may be configured to be cloud-agnostic so that the golden copy 132 may be used to generate cloud resources with respect to any cloud provider (or any of a specified set of cloud providers). In some other implementations, the golden copy 132 may include a number of components, each of which may correspond to a different cloud provider of a specified set of cloud providers.

The provisioning engine 105 may generate, on the cloud resources 114, a virtual server 133 that may host a base platform 134 that may provide development resources to facilitate development and deployment. For example, the provisioning engine 105 may instantiate the base platform 134 using a fully managed service 136A that provides a protocol access 136B to the virtual server 133. The protocol access 136B may be associated with a remote desktop protocol (RDP) and/or a secure shell protocol (SSH), among other examples. The provisioning engine 105 may generate the serverless resource 117 on the cloud resources 114.

The serverless resource 117 may, based on a resource identifier (ID), provide a user interface 103 for receiving a second set 119 of user input. The second set 119 of user input may indicate, for example, a continuous integration tool, a resource name, a repository location, and/or a technology associated with the DevOps procedure, among other examples. The second set 119 of user input may be provided to a machine learning model 107A (which may be a component of the recommendation engine 107), which may be configured to recommend one or more technology stacks from a set of technology stacks. The set of technology stacks may include, for example, a first technology stack associated with a first technology (T1S1), a second technology stack associated with the first technology (T1S2), and an nth technology stack associated with the first technology (T1Sn). Similarly, the set of technology stacks may include a first technology stack associated with a second technology (T2S1), a second technology stack associated with the second technology (T2S2), and an nth technology stack associated with the second technology (T2Sn). There may be any number of technology stacks in the set of technology stacks, such as, for example, an nth technology stack associated with an nth technology (TnSn).

As discussed above, the machine learning model 107A may generate a recommendation 107B that includes at least one suggested technology stack. During a customization process 107C, the machine learning model 107A may be trained and at least one technology stack may be selected. The selected technology stack 139 may be instantiated by the deployment engine 109, which may dynamically generate tools 140 corresponding to the selected technology stack 139. The deployment engine 109 may generate the tools 140 using automated code generation. For example, the deployment engine 109 may access a source code management 141 function to retrieve automated code generating protocol modules 142 (e.g., pipeline as a code, infrastructure as a code, and/or compliance as a code, among other examples), which may be used to generate the tools 140 dynamically and automatically. Using the code generating protocol modules 142 may facilitate generating tools and applications that satisfy business objectives while adhering to global compliance requirements.

Using the tools 140 and, in some implementations, the code generating protocol modules, the deployment engine 109 may generate one or more applications 143A, 143B, 143C, and 143D. The deployment engine 109 may deploy the one or more applications 143A, 143B, 143C, and 143D in any number of different serverless deployment environments 143E, 143F, 143G, and/or 143H. Serverless deployment environments 143E, 143F, 143G, and/or 143H may include, for example, virtual machines, containers, Kubernetes, and/or function-based deployment environments, among other examples. A function-based deployment environment is an environment in which an application (or a component thereof) is deployed as one or more functions.

In some implementations, one application may be deployed in one serverless deployment environment. In some implementations, one application may be deployed in multiple serverless deployment environments. For example, multiple instances of the application may be deployed, where each instance is deployed in a different serverless deployment environment. In another example, the application may be formed from a number of application components, each of which may be deployed in a different serverless deployment environment. In some implementations, multiple applications may be deployed in one serverless deployment environment. In some implementations, multiple applications may be deployed in multiple serverless deployment environments. For example, each application may be formed from a respective set of application components, each of which may be deployed in a different serverless deployment environment, alone or with one or more components of one or more other applications. Any number of combinations of the above are considered to be within the ambit of this disclosure.

In some implementations, as shown in FIG. 1C, a data shipper 144A may obtain data from the deployed applications 143A, 143B, 143C, and/or 143D and/or the selected technology stack 139 (and/or one or more of the tools 140). The data may be filtered using data filter 144B and provided to the database 124 for use by the machine learning model 125. For example, the machine learning model 125 may facilitate analysis of deployed applications 143A, 143B, 143C, and/or 143D to provide feedback as to the operations thereof. The feedback may include information that may help a user and/or a system to understand behavioral patterns of applications monitor events, understand application behavior at given time intervals, and/or determine applications that are more important than other applications across environments. In some implementations, the feedback may include information that may facilitate optimizing memory usage by causing the system 100 to deactivate applications that are not used during a given time interval. In some implementations, feedback information may be indicated via a feedback dashboard 145 that may be provided by the UI 103. A feedback dashboard may include a UE that displays one or more representations of feedback information.

In some implementations, the feedback may include information that identifies anomalous activity. For example, the machine learning model 125 may identify an outlier (e.g., a deviation in performance, memory consumption, and/or processing power consumption). In some examples, the machine learning model 125 may identify a deviation in time consumption. For example, the machine learning model 125 may identify a process that is more time-consuming than other processes (or than the process is expected to be). Time-consumption outliers may lead to unnecessary computing resource consumption, memory consumption, and/or degradation in performance. In some examples, the machine learning model 125 may identify a root cause for an event based at least in part on correlating historical events. In some examples, the machine learning model 125 may predict application behavior based at least in part on historical data and, in some implementations, may provide an alert that indicates one or more defects. The machine learning model 125 may, based at least in part on any one or more aspects of feedback information, suggest (e.g., to a user and/or to the system) a modification that may enhance the code quality. In some examples, the feedback information may be used for retraining machine learning model the machine learning model 125 (and/or other machine learning models described herein) and/or may indicate a suggestion (e.g., to a user or the system) of a modification that may be made to enhance the code quality, performance metrics, recommendations, and/or root-cause identification, among other examples.

In some aspects, as shown in FIG. 1C, the machine learning model 125 may be implemented according to a nested configuration. For example, a memory optimization component 125A may instantiated by the machine learning model 125 may be configured to perform one or more mitigation tasks based at least in part on feedback information. The feedback information may be generated by a feedback component 125B. The feedback component 125B may include any number of different machine learning models 125C, 125D, and/or 125E. Machine learning models may 125C, 125D, and/or 125E may include, for example, machine learning models configured to determine influencers for memory utilization, root causes of anomalies, mitigation tasks corresponding to root causes, anomaly detection associated with memory usage and/or processing resource consumption, among other examples.

FIG. 1D is a diagram illustrating an example technical flow associated with a recommendation engine 107. As shown, the recommendation engine 107 may include a knowledge repository 107D that stores a plurality of technology stacks (shown as "T1S1," "T1S2," "T1S3," and "TnSn"). Based at least in part on the knowledge repository 107D and a set 119A of user inputs (which may be at least a portion of the second set 119 of user inputs described above, for example), a machine learning model 107A generates a first recommendation that may include a set of suggested technology stacks 146A, 146B, and 146C. In implementations, the recommendation may include any number of suggested technology stacks (e.g., one, two, three, or more than three).

As shown, each of the suggested technology stacks 146A, 146B, and 146C includes one or more tools. For example, the suggested technology stack 146A includes tool 1 (shown as "1"), tool 2 (shown as "2"), tool 3 (shown as "3"), and tool 4 (shown as "4"). The suggested technology stack 146B includes tool 5 (shown as "5"), tool 6 (shown as "6"), tool 7 (shown as "7"), and tool 8 (shown as "8"). The suggested technology stack 146C includes tool 9 (shown as "9"), tool 10 (shown as "10"), tool 11 (shown as "11"), and tool 12 (shown as "12").

As shown, the recommendation engine 107 may receive a set 119B of user inputs (which may be at least a portion of the second set 119 of user inputs described above, for example) to facilitate a customization process. The customization process may include determining one or more selected tools and/or technology stacks based at least in part on the set 119B of user input. For example, the set 119B of user input may indicate a selection, by the user, of tools 1 and 2, and an indication that, instead of tool 3, the user wishes to use a tool 13 (shown as "13"). Based on the set 119B of user input, the recommendation engine 107 may generate a second recommendation that includes suggested technology stacks 146D, 146E, and 146F. In some cases, for example, the recommendation engine 107 may utilize one or more machine learning models to determine one or more additional tools that should be suggested with the combination of tools 1, 2, and 13. The one or more additional tools may include tools that, for example, are commonly used with tool 13 and/or the combination of tools 1, 2, and 13. In the illustrated example, the recommendation engine 107 may determine that a tool 14 (shown as "14"), a tool 15 (shown as "15"), and a tool 16 (shown as "16") would be potentially appropriate tools to include with a combination of tools 1, 2, and 13. Based on that determination, the recommendation engine 107 may generate a second recommendation that includes the suggested technology stacks 146D, 146E, and 146F.

As shown, for example, the suggested technology stack 146D may include tool 1, tool 2, tool 13, and tool 14. The suggested technology stack 146E may include tool 1, tool 2, tool 13, and tool 15, and the suggested technology stack 146F may include tool 1, tool 2, tool 13, and tool 16. In some examples, the process of generating a recommendation and receiving user input indicating selection and/or modification of tools in the suggested technology stacks may be iterated any number of times. The recommendation engine 107 may receive a set 119C of user input (which, in some cases, may be a subset of the set 119B of user input) that may indicate a selection of a suggested technology stack. For example, as shown in FIG. 1D, the user may select, via the set 119C of user input, the suggested technology stack 146E, which includes tool 1, tool 2, tool 13, and tool 15. Based at least in part on the selection, the recommendation engine 107 may output a selected technology stack 139, as described above. As shown, for example, the selected technology stack 139 may include the selected tools. In some implementations, the selected technology stack 139 may be used to further train the machine learning model 107A and/or to further iterate an operation of the machine learning model 107A. In this way, the machine learning model 107A may learn tools selections that correspond to sets of user inputs and/or other contextual information. Thus, over time, the machine learning model 107A may suggest more and more relevant technology stacks, thereby reducing the amount of time and/or processing involved in the customization step. In this way, some implementations of the system described herein may facilitate serverless development of applications using less computing resources and, thus, less memory and power consumption as compared to conventional serverless deployment techniques.

FIG. 1E is a diagram illustrating an example operation of a provisioning engine 105. For example, FIG. 1E depicts a process by which the orchestrator agent 127 is configured to dynamically create the required cloud resources across cloud providers when they are needed. The intelligence used for creating the cloud resources dynamically using the control architecture depicted in FIG. 1E may facilitate enabling the system device 102 to run more efficiently, as compared to conventional techniques, when providing a platform (e.g., a DevOps platform or other platform for deploying applications), as unneeded resources are not created and/or are deleted after being used. Additionally, the illustrated architecture implemented by the system device 102 may be designed such that it is cloud agnostic and has the potential to bring up infrastructure on the fly (e.g., when the infrastructure is going to be used by the system device 102) using everything as a code. The control-based architecture depicted in FIG. 1E is implemented for secure workflow. A control-based architecture is an architecture in which one entity (e.g., a controlling entity, a controller and/or an agent, among other examples) controls the operations of another entity (e.g., a controlled entity and/or a helper, among other examples). A control-based architecture may be referred to, for example, as a primary/secondary architecture, a controller/agent architecture, and/or a parent/child architecture, among other examples. In some cases, the roles in a control-based architecture can be reversed such that a first entity can control a second entity in one scenario, and the second entity can control the first entity in another scenario. An entity may include, for example, an object, a container, an agent, an API, a device, a component of a device, and/or any other software and/or hardware. The cloud credentials are used in an isolated environment (controlled container) for creating the cloud resources and destroyed after execution. Implementations of the illustrated architecture also may enable parallel execution of processes in isolated environments and reduction of memory consumption by destroying the controlled container after execution.

As shown, the orchestrator agent 127 may establish a provisioning operation associated with a provision identifier (ID). The orchestrator agent 127 may provide the provision ID to the database 128 and to the credential vault 129C. In some implementations, the system may be configured with a specified set of cloud providers and the orchestrator agent 127 may obtain one or more code templates associated with the cloud provider (e.g., infrastructure-as-a-code templates and/or cloud code templates, among other examples) and/or cloud-specific packages to be used to instantiate the provisioning engine. In the illustrated example, the system is configured with three cloud providers (shown as "CP1,"

"CP2," and "CP3"). For example, as shown by reference number 147B, the orchestrator agent 127 may determine whether the cloud provider (shown as "CP") is the first identified cloud provider, CP1. If so, as shown by reference number 147C, the orchestrator agent 127 may obtain the corresponding one or more code templates and/or code packages (shown as "CP1 T/P"). The cloud provider may maintain a template repository that includes a number of code templates and/or code packages for deploying one or more architectures in a cloud associated with a cloud provider. If the cloud provider is not the first identified cloud provider CP1, as shown by reference number 147D, the orchestrator agent 127 may determine whether the cloud provider is the second identified cloud provider, CP2. If so, as shown by reference number 147E, the orchestrator agent 127 may obtain the corresponding one or more code templates associated with the cloud provider and/or cloud-specific packages (shown as "CP2 T/P"). If not, as shown by reference number 147F, the orchestrator agent 127 may determine that the cloud provider is the third identified cloud provider, CP3 and may obtain the corresponding the corresponding one or more code templates associated with the cloud provider and/or cloud-specific packages (shown as "CP3 T/P"), as shown by reference number 147G.

As shown, the orchestrator agent 127 may generate the dynamic provision container 131A based at least in part on the URL and a set of user inputs. The dynamic provision container 131A may be configured to be controlled by the orchestrator agent 127. The relationship between the orchestrator agent 127 and the dynamic provision container may be referred to, for example, as a primary/secondary architecture, a controller/agent architecture, and/or a parent/child architecture, among other examples. The dynamic provision container 131A may include a control architecture repository 131H associated with the relationship between the orchestrator agent 127 and the dynamic provision container 131A.

At reference number 131I, the dynamic provision container 131A may clone the obtained one or more code templates and/or cloud-specific packages (, and may create the cloud resources to generate the base platform 134. The base platform 134 may include, for example, a first set 131J of cloud resources corresponding to the first identified cloud provider CP1, a second set 131K of cloud resources corresponding to the second identified cloud provider CP2, and/or a third set 131L of cloud resources corresponding to the third identified cloud provider CP3. The dynamic provision container 131A also may generate a serverless environment 137 associated with the provision ID 147A. The dynamic provision container 131A may generate, within the serverless environment 137, any number of resources 137A, image pull secrets 137B, and/or log storage 137C, among other examples.

As shown in FIG. 1E, the dynamic provision container 131A also may generate, based at least in part on the cloud resources 131J, 131K, and/or 131L, the fully managed service 136A. As shown by reference number 131M, remote execution within the fully managed service 136A (e.g., a cloud bastion service such as an Azure Bastian service, an Amazon Web Services (AWS) bastion service, and/or a Google cloud bastion service, among other examples) may include creating a secret 131N by pulling a container image from a registry and/or artifact management tool (e.g., an Azure Container Registry, a GitLab Registry, a Docker Registry, a Google Registry, and/or an AWS Registry, among other examples), creating a tool stack 131O, and creating a platform URL 131P. As shown by reference number 147H, the dynamic provision container 131A may provide provision information a state file to the credential vault 129C. The provision information may include, for example, a file and/or metadata that indicates information and/or a current state associated with a provisioned infrastructure and/or configuration. The provision information may be generated based at least in part on the remote execution in the fully managed service 136A. As shown by reference number 147I, the dynamic provision container 131A may provide network details, secret IDs, and/or provision status indications, among other examples, to the database 128. In some implementations, as shown by reference number 147J, the orchestrator agent 127 may delete the dynamic provision container 131A (shown as "DPC") based at least in part on completion of execution of the dynamic provision container 131A.

FIG. 1F is a diagram illustrating example processing associated with the deployment engine 109. In various implementations, the deployment engine 109 may create technology stacks on a serverless environment seamlessly. The deployment engine 109 also automates the registration of an agent (e.g., a runner) of a tool that may facilitate continuous processes (e.g., continuous integration, continuous testing, and/or continuous deployment, among other examples), facilitating handsfree execution, thus minimizing the need for user involvement and providing a faster, more reliable development experience for the user simultaneously with reducing memory and processing requirements on the system device 102. The deployment engine 109 also uses a control-based architecture similar to the control-based architecture described above in connection with FIG. 1E. The orchestrator agent 127 may create tools and resources associated with the deployment engine 109 only at the time of execution and may automatically destroy the tools and resources after task completion, thereby reducing memory usage and processing burdens.

As shown in FIG. 1F, the deployment engine 109 may interact with a user device 101 to receive user inputs that may be used to facilitate a configuration process 109A. Based at least in part on the configuration process 109A, the orchestrator agent 127 may be instantiated. The orchestrator agent 127 may instantiate a helper container 109B that is configured to be controlled by the orchestrator agent 127. As shown by reference number 109C, the orchestrator agent 127 may provide repository information to a database 109D. As shown by reference number 109E, the helper container 109B may retrieve information from the database 109D. As shown by reference number 109F, the helper container 109B may retrieve runner/agent tags (e.g., tags associated with an agent that facilitates running tasks in a pipeline) via a call associated with an application programming interface (API) 109G and provide the runner/agent tags to the platform 134.

As shown, the deployment engine 109 may instantiate (or otherwise interact with) the base platform 134, which may include any number of resources such as, for example, a web server 134A (e.g., a reverse proxy/webserver), a directory access protocol 134B (e.g., a user active directory), a directory access protocol administration application 134C (e.g., a continuous integration tool/application), a software automation server 134D (e.g., continuous integration and/or continuous testing tools associated with a software development lifecycle), a DevOps software component 134E (shown as "DOSw") (e.g., source code management), and a runner 134F (e.g., a runner/agent). The helper container 109B may register the runner 134F and, as shown by reference number 109H, may update a runner registration status in the database 109D. As shown by reference number 109I, the deployment engine 109 may determine whether the registration status of the runner 134F indicates a successful registration and, if so, as shown by reference number 109I, may delete the helper container 109B. If not, the deployment engine 109 may determine whether the runner 134F is registered, as shown by reference number 109K. If the runner 134F is registered, the deployment engine 109 may delete the helper container, as shown by reference number 109J. If not, the deployment engine 109 may delete the runner 134F, as shown by reference number 109L and then delete the helper container, as shown by reference number 109J.

As shown by reference number 109M, the orchestrator agent 127 may retrieve the runner status from the database 109D and, as shown by reference number 109N, may cause the UI 103 to provide an interface to the user to facilitate receiving a user input to enable deployment. At reference number 109O, the deployment engine 109 may create variables in the DevOps software component 134E. As shown by reference number 109P, the deployment engine 109 may execute pipeline as a code to generate applications. For example, as shown, the deployment engine 109 may perform executions within the serverless environment 137. For example, as shown, the deployment engine 109 instantiates the selected technology stack 139 in the serverless environment 137 and executes ("Exe") the tool 3 based at least in part on a corresponding execution blueprint A1, reports ("Rep") the execution and/or information associated with the execution, and then deletes ("Del") the tool 3. The process may be repeated for each of the other tools (e.g., tool 6, tool 9, and tool 12) in the selected technology stack 139 based at least in part on the corresponding execution blueprints A2, A3, and A4. In some implementations, the execution of one tool may trigger the execution of the next tool. Based at least in part on executing the tools in the selected technology stack 139, the deployment engine 109 may deploy the generated applications 121.

FIG. 1G is a diagram illustrating an example automated runner registration process. As described above, the runner 134F may be registered by the deployment engine 109 using an automated process. The automated runner registration process is performed based at least in part on dynamic instantiation of runner agents and runner helpers. The runner agents and runner helpers may be instantiated as isolated containers. In this way, involved logic may be implemented automatically to perform tasks such as, for example, fetching parameters based on user input, automatically assigning tags, and/or validating tag value uniqueness, among other examples. In this way, implementations of the runner registration process may reduce opportunities for user error and user interaction time, thereby providing a more efficient application development and deployment experience.

As shown by reference number 109Q, the UI 103 may receive user input. The deployment engine 109 may instantiate a runner agent 109R that receives the user input and performs a configuration process 109S. As part of the configuration process 109S, the runner agent 109R may receive a DevOps token and a DevOps URL from the DevOps software component 134E via a project ID API 109T. The runner agent 109R may receive a runner token from the DevOps software component 134E via a runner token API 109U. The runner agent 109R may provide configuration information to a database 109V. The configuration information may include, for example, the DevOps token, a runner name, a provision ID, a branch ID, a personal file, and/or resource details, among other examples. The runner agent 109R may execute a runner registration process 109W based at least in part on the configuration information.

As shown, the runner registration process 109W may register the runner 134F, which may control a helper agent 109X via an API 109Y. The runner registration process 109W may receive a set of runner registration parameters such as deployment tags from the DevOps software component 134E via a repository API 109Z, which is an API that interacts with a repository hosted by the DevOps software component 134E to retrieve runner registration parameters. The helper agent 109X may be implemented, for example, as an isolated runner registration container, and may be instantiated based at least in part on the DevOps software URL, one or more runner tags, and/or the runner registration token, among other examples. The helper agent 109X may register the runner based at least in part on the runner registration parameters, deploy the runner 134F on the base platform 134, as shown, and may provide a runner registration update to the database 109V.

FIG. 1H is a diagram illustrating an example of task execution associated with tools for generating applications, in accordance with the present disclosure. As shown in FIG. 1H, a continuous integration (CI) definition, a continuous deployment (CD) definition, and a continuous testing (CT) definition may be stored in a repository 148A. Tools of the selected technology stack 139 may correspond to one of these definitions. For example, the tool 3 and the tool 6 may correspond to the CI definition, the tool 9 may correspond to the CD definition, and the tool 12 may correspond to the CT definition. In some implementations, the tools in the selected technology stack may be generated using tool images (executables that are encapsulated with the tool and its dependencies). For example, a first tool image 148B may be used to generate the tool 3, a second tool image 148C may be used to generate the tool 6, a third tool image 148D may be used to generate the tool 9, and a fourth tool 148E may be used to generate the tool 12.

The deployment engine 109 may determine a task definition for each tool of the selected technology stack 139. For example, a tool 3 task definition (shown as "T3 task def") may correspond to the tool 3 of the selected technology stack 139, a tool 6 task definition (shown as "T6 task def.") may correspond to the tool 6 of the selected technology stack 139, a tool 9 task definition (shown as "T9 task def") may correspond to the tool 9 of the selected technology stack 139, and a tool 12 task definition (shown as "T12 task def.") may correspond to the tool 12 of the selected technology stack 139. For each task definition, the deployment engine 109 may perform a task execution process (shown as "exe"). In some implementations, the deployment engine 109 may retrieve credentials (shown as "cred.") stored in the credential vault 129C and use them to facilitate execution of the tools.

For each task definition, the deployment engine 109 may generate an observer 148F, 148G, 148H, and 148I, respectively. As shown, respectively, by reference numbers 148J, 148K, 148L, and 148M, the observers 148F, 148G, 148H, and 148I may be configured to check continually for the respective status of task execution. Once the defined task is completed (e.g., when the status of task execution is "stopped"), an extractor 148N, 148O, 148P, or 148Q, respectively, fetches the logs for reporting (shown as "report") to the analytics engine 126 and autodeletes the tool. The task can be executed in parallel or in sequence depending on how the task is defined.

FIG. 1I is a diagram illustrating an example of a task execution scheme. As shown, the execution of one or more tasks, including a scheme for executing a plurality of tasks, may be defined by one or more execution blueprints. In some cases, tasks may be executed sequentially. Sequentially executed tasks may be, for example, dependent tasks (e.g., tasks that depend on, or are depended on by, other tasks). For example, an execution blueprint may cause the deployment engine 109 to execute a task 1, delete the task 1, then execute a task 2, delete the task 2, then execute a task 3, and then delete the task 3. By deleting each task before executing the next task in the sequence, implementations described herein may facilitate reducing memory consumption, cost, and/or processing burdens.

As shown, tasks may be executed in parallel. For example, as shown, the execution blueprint may cause the deployment engine 109 to execute a task 4, then delete the task 4. The execution and/or deletion of the task 4 may occur at the same time as, or at a different time than, execution and/or deletion of one of the tasks 1-3, or a task 5, which also may be executed in parallel. Any number of tasks may be executed sequentially or in parallel. In some implementations, tasks executed in parallel may be non-dependent tasks. In some implementations, dependent tasks may be executed in parallel and/or non-dependent tasks may be executed sequentially.

The deployment engine 109 also may intelligently perform deletion of runners and serverless resources when an option for deletion is selected by a user via the UI 103. FIG. 1J is a diagram illustrating an example of a runner deletion process. As shown, for example, a user input indicating runner deletion is received via the UE 103 and provided to the orchestrator agent 127. The orchestrator agent 127 may generate a deletion helper container 149A (shown as "helper container") configured to be controlled by the orchestrator agent 127. The deletion helper container 149A may obtain credentials and or command line interface (CLI) details from the credential vault 129C and based at least in part on the credentials and/or CLI details, may delete the runner 134F (as represented by the "x" placed on the runner 134F in FIG. 1J).

As shown by reference number 149B, the deletion helper container 149A may determine whether the runner status is active. If so, as shown by reference number 149C, the deletion helper container 149A may change the status to inactive. If not, the deletion helper container 149A may end the status update process, as shown by reference number 149D. As shown by reference number 149E, the deletion helper container 149A may update the runner status information in the database 109D. In some implementations, after the deletion helper container 149A completes the runner deletion process described above, the orchestrator agent 127 may delete the deletion helper container 149A.

After the deployment engine 109 has completed deployment of the applications using the serverless resource, the deployment engine 109 may delete the serverless resource. FIG. 1K is a diagram illustrating an example of a process for deleting the serverless resource. As shown, the deployment engine 109 may receive, via the UI 103, a user selection of an option to delete the serverless resource. The orchestrator agent 127 may generate a deletion helper container 150A (shown as "helper container"). As shown by reference number 150B, the deletion helper container 150A may determine whether the pipeline is still active. If so, as shown by reference number 150C, the deletion helper container 150A may cause an indication to be displayed to the user. The indication may indicate that the pipeline is to be deleted. If the pipeline is not active, as shown, the deletion helper container 150A may retrieve a state file from the credential vault 129C and use the state file to delete the serverless resource, as shown by reference number 150D. The deletion helper container 150A may update the database 109D regarding the status of the deleted serverless resources. As shown by reference number 150E, the UI 103 may retrieve the status update from the database 109D for display to the user.

FIG. 1L is a diagram illustrating an example of an analytics process, in accordance with the present disclosure. As shown, a number of applications (shown as "A1," "A2," . . . "A16") may be deployed across a number of serverless resources such as virtual machines ("VM"), containers, Kubernetes clusters (shown as "K8s"), and/or functions, among other examples. As shown, some of the applications may interact with one another, in which case a relationship may be said to exist between them. Some applications may interact with more than one other application. In some implementations, an application interacts with another application by providing information to the other application, receiving information from the other application, depending on the other application (e.g., whether or not there is communication between the two applications), and/or being depended on by the other application. In FIG. 1L, arrows represent relationships between applications.

In some implementations, the analytics engine 126 may be configured to perform analytics associated with the behavior of one or more applications and/or one or more relationships between applications. According to various implementations, the analytics engine 126 may be configured to perform any number of different types of analytics. In some implementations, for example, the analytics engine 126 may use one or more semantic networks 151 to model application behavior and/or relationships as graphs, which may be stored in a graph database 152. In some cases, a graph may identify a most connected application. For example, in FIG. 1L, the application A6 is the most connected application. It has communications originating from the application A1, the application A3, and the application A4, and communications being sent to the application A9, the application A10, and the application A10.

As shown in FIG. 1L, the graph database 152 may provide the graph to the machine learning model 125. The machine learning model 125 may be trained with data associated with application interactions and/or dependencies, among other examples. The machine learning model 125 may be configured to generate a prediction 153. In some implementations, the machine learning module 125 may be an issue prediction machine learning model. An issue prediction machine learning model is a machine learning model configured to predict a future issue with an application or an application parameter based at least in part on one or more behaviors associated with another application or application parameter. The prediction 153 may include a prediction of a downstream issue resulting from an upstream error. For example, if the application A6 fails (e.g., fails to perform its intended tasks, is inadvertently deleted, and/or experiences an internal error, among other examples), the machine learning model 125 may generate a prediction 153 that one or more of the applications A9, A10, and A12 may experience errors as a result. In some implementations, the analytics engine 126 may provide, for display, an alert based at least in part on the prediction 153. In some implementations, the analytics engine 126 may perform a mitigation task to avoid the downstream error based at least in part on the prediction 153. In some implementations, the analytics engine 126 may correlate multiple events to perform a root-cause analysis and/or may intelligently detect anomalous patterns and/or behaviors in the ecosystem. In this way, implementations of the system (e.g., a system for providing a DevOps platform or other platform for deploying applications) described herein may be configured to reduce downtime in deployed applications automatically.

In some implementations, the analytics engine 126 may be configured to perform a memory optimization function 154. For example, at a given instance or time interval, the analytics engine 126 may collect data associated with the applications in a running state or states and an idle state or states. A running state may also be referred to as an operative state. The data may be used for training the machine learning model 125, which may be an application dependency machine learning model. An application dependency machine learning model is a machine learning model that may be configured to identify application dependencies and, based at least in part on the application dependencies, an application that may not be used during a predicted time period. After a specified set of observations, based at least in part on the patterns and trends associated with application states, the machine learning model 125 may learn which applications are required to be in running state when a dependent application is running. In this way, the machine learning model 125 may be used to identify an unused application. The analytics engine 126 may be configured to deactivate the unused application automatically, thereby optimizing memory and reducing processing burdens as compared to implementations where unused applications are not deactivated.

For example, in some cases, the deployment engine 109 may perform a batch execution according to a specified time period. The machine learning model 125 may determine, for example, that the applications A7, A8, and A13 are unused and need not be in a running state during this batch execution. The analytics engine 126 may perform a mitigation procedure, in which the analytics engine 126 may automatically deactivate the unused applications A7, A8, and A13, thereby optimizing memory and reducing processing burdens. In this way, implementations may facilitate providing a sustainable lean serverless DevOps system as compared to an ecosystem of a traditional DevOps environment and installed tools that do not deactivate unused applications.

In some implementations, the analytics engine 126 may perform a memory optimization and anomaly detection function. In some implementations, for example, the analytics engine 126 may include a logic for identifying the influential parameters that consume memory. This logic may be configured to perform 360-degree analysis to identify anomalies intelligently, which otherwise may not be able to be noticed by a user.

FIGS. 1M-1P are diagrams illustrating examples of the memory optimization and anomaly detection function. As shown in FIG. 1M, the data shipper 144A may extract data associated with application behaviors, dependencies, statuses, relationships, and memory usage from the serverless environment 137. The data may be provided to the analytics engine 126. The analytics engine 126 may include the machine learning model 125, which may incorporate one or more machine learning processes (e.g., the machine learning model 125 may represent one machine learning model or a plurality of machine learning models). The machine learning model 125 may perform a feature extraction function 155 based at least in part on the data. For example, the feature extraction function 155 may include extraction of features from the data based on context or domain.

The extracted features may include, for example, memory usage metrics associated with each application for a specified time instance or time period. In some implementations, the feature extraction function 155 extracts only the parameters relevant to memory automatically. As a result, implementations may improve the accuracy of prediction by using only relevant data for training, thereby eliminating bias in prediction. Each parameter may have different units (e.g., units of memory, units of time, and/or units of power, among other examples) and measures against different scales (e.g., bytes, megabytes, kilobytes, nanoseconds, milliseconds, seconds, minutes, and/or hours, among other examples). The feature extraction function 155 may make the extracted parameters consistent by converting all the units to a common scale of 0-100. The features may include any number of different features. In some implementations, hundreds of different types of features may be extracted. In some cases, available features for extraction may include, for example, parameters that indicate a central processing unit (CPU) completely fair scheduler (CFS), a disk input output (IO) read, a network in indicator, a network out indicator, a process ID, a group path, a memory share, and a memory size. Logic filters associated with the feature extraction process 155 may filter the data so that only memory metrics—features related to memory—are extracted such as, for example, CPU CFS, Disk Io Read, Memory Share, and Memory Size.

The machine learning model 125 may perform an influential parameter calculation 156 based at least in part on the extracted features. The influential parameter calculation 156 may determine relative influence metrics. A relative influence metric may include, for example, an influence of each application on total memory consumption. For example, in some implementations, the influential parameter calculation 156 may determine a percentage of a total memory usage associated with an application during the specified time period. The output of the influential parameter calculation, a set of memory usage parameter information, may be stored in the database.

The machine learning model 125 may perform an anomaly detection function 157 based at least in part on the stored extracted features. An anomaly may refer to a deviation from previously-observed parameter values. The deviation may include a memory consumption deviation, a power consumption deviation, and/or a deviation in a parameter of an application, among other examples. In some implementations, an anomaly may be intelligently identified when the difference between a current parameter value and a prior parameter value of the same parameter satisfies a deviation condition. The deviation condition may include, for example, an anomaly detection threshold. Based at least in part on the identified anomaly, the analytics engine 126 may provide an alert (e.g., a real-time alert) for display via the dashboard 145. In some implementations, the analytics engine may mitigate the anomaly (e.g., by deactivating an application associated with the anomaly).

In implementations, the analytical engine 126 may use anomaly detection for any number of different use cases. In some of these use cases, for example, an anomaly may be detected even though a maximum limit of 100% of memory consumption limit may not be reached. For example, the analytical engine 126 may detect an anomaly when there is a significant deviation in the percentage of influence of an application parameter on total memory usage from a previous trend associated with the influence of the application parameter on the total memory usage. The analytical engine 126 may detect an anomaly when a new parameter is consuming enough memory resources as to have a detectable influence on the total memory usage. In another example, the analytical engine 126 may detect an anomaly when a previously observed parameter that was consuming memory is no longer consuming memory. The analytical engine 126 may identify anomalous behavior automatically and in real-time.

As shown in FIGS. 1N-1P, for example, the percentage of memory consumed by each parameter (P1, P2, . . . , P7) may be calculated for a configurable time period (e.g., a time period of 15 minutes, as illustrated, or for any other time period that may be configured according to a business requirement) and the influential parameters may be identified. FIGS. 1N-1P includes diagrams representing examples 158, 159, and 160, respectively, of the set of influential parameters, and the associated percentages of memory consumed by the parameters, at specified time instances. When a percentage of memory consumed deviates by more than an acceptable range from a previous trend, then it is highlighted as an anomaly.

For example, as shown in FIG. 1N, the same parameters, P1, P2, P3, P4, P5, P6, and P7 consume memory at each of the four illustrated time instances. The respective memory consumption of each of the parameters at each of the first three time instances is relatively consistent, as shown. However, at 00:45 hours, the respective memory consumptions of P1 and P5 deviate from the previous trend of memory consumption. These deviations may satisfy a threshold and, therefore, the respective memory consumptions of P1 and P5 at 00:45 hours may be identified as anomalies. In some implementations, the parameters P1 and P5 may be identified as anomalous application parameters.

When a new parameter consumes memory that was not observed in the past, then the memory consumption by the new parameter may be detected as an anomaly. For example, as shown in FIG. 1O, the same parameters, P1, P2, P3, P4, P5, P6, and P7 consume memory at each of the first three illustrated time instances. The respective memory consumption of each of the parameters at each of the first three time instances is relatively consistent, as shown. However, at 00:45 hours, a new parameter, P8, consumes 10.7% of the memory, and this consumption was not observed in the prior three time instances. Accordingly, the memory consumption by P8 may be detected as an anomaly. In some implementations, the consumption of memory by P8 may contribute to an overall deviation of total memory consumed. This overall deviation may trigger analysis of the parameters, for example. Additionally, P2, which was included in the first three time instances, is no longer shown, indicating that any consumption of memory by P2 at 00:45 hours is not significant enough to be detectable as an influential pattern. The omission of P2 at 00:45 hours also may be detected as an anomaly.

When the overall memory consumption does not have a significant deviation, but a new parameter is identified as consuming memory, the memory consumption by the new parameter may be detected as an anomaly. For example, as shown in FIG. 1O, the same parameters, P1, P2, P3, P4, P5, P6, and P7 consume memory at each of the first three illustrated time instances. The respective memory consumption of each of the parameters at each of the first three time instances is relatively consistent, as shown. However, at 00:45 hours, a new parameter, P9, consumes 5.1% of the memory, and this consumption was not observed in the prior three time instances. Although the overall memory consumption does not vary significantly in the 00:45 time instance, the memory consumption by P9 may be detected as an anomaly because it was not detected in any of the prior three time instances.

The serverless environment-based provisioning and deployment system described herein may facilitate dynamic provisioning of resources and tools that are used in the development and/or deployment of applications such that they only consume memory and processing power when they are actively being used. Additionally, automation of technology stack recommendations, tool generation, and application generation may minimize the amount of user interaction with the system, thereby reducing the potential for user error and increasing the speed at which applications can be developed and deployed. Moreover, the dynamic and automated nature of the pipeline and tool generation described herein may facilitate ease of scalability.

As indicated above, FIGS. 1A-1P are provided as an example. Other examples may differ from what is described with regard to FIGS. 1A-1P. The number and arrangement of devices shown in FIGS. 1A-1P are provided as an example. In practice, there may be additional devices, fewer devices, different devices, or differently arranged devices than those shown in FIGS. 1A-1P. Furthermore, two or more devices shown in FIGS. 1A-1P may be implemented within a single device, or a single device shown in FIGS. 1A-1P may be implemented as multiple, distributed devices. Additionally, or alternatively, a set of devices (e.g., one or more devices) shown in FIGS. 1A-1P may perform one or more functions described as being performed by another set of devices shown in FIGS. 1A-1P.

Figure 2:
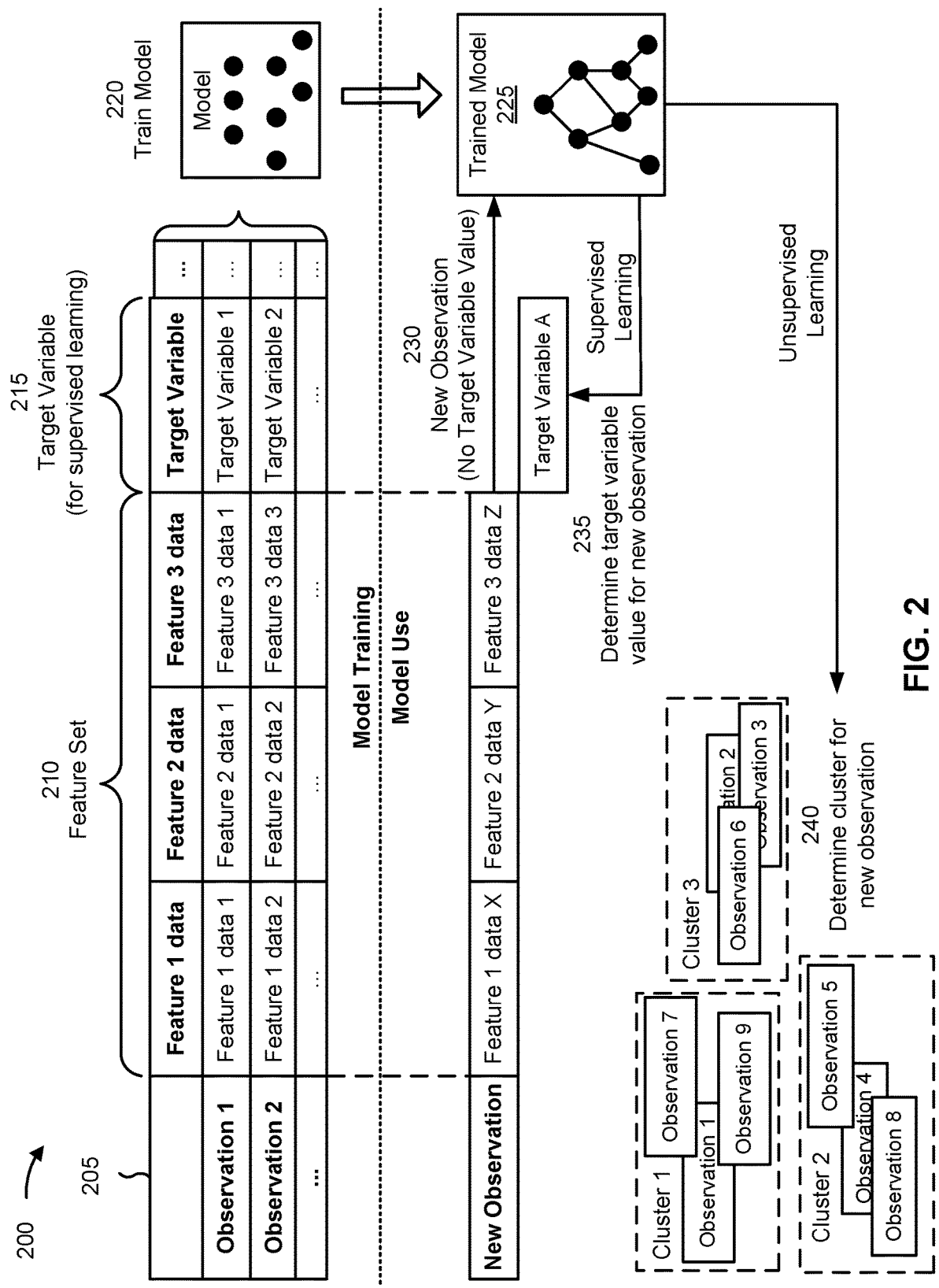
FIG. 2 is a diagram illustrating an example of training and using a machine learning model.

FIG. 2 is a diagram illustrating an example 200 of training and using a machine learning model in connection with a serverless environment-based provisioning and deployment system. The machine learning model training and usage described herein may be performed using a machine learning system. The machine learning system may include or may be included in a computing device, a server, a cloud computing environment, or the like, such as the system device 330 and/or the user device 340 described in more detail elsewhere herein. The machine learning system may be, include, or be included in, for example, the recommendation engine 107, the analytics engine 126, and/or the machine learning model 125, described herein.

As shown by reference number 205, a machine learning model may be trained using a set of observations. The set of observations may be obtained from training data (e.g., historical data), such as data gathered during one or more processes described herein. In some implementations, the machine learning system may receive the set of observations (e.g., as input) from the user device 340, as described elsewhere herein.

As shown by reference number 210, the set of observations includes a feature set. The feature set may include a set of variables, and a variable may be referred to as a feature. A specific observation may include a set of variable values (or feature values) corresponding to the set of variables. In some implementations, the machine learning system may determine variables for a set of observations and/or variable values for a specific observation based on input received from the user device 340. For example, the machine learning system may identify a feature set (e.g., one or more features and/or feature values) by extracting the feature set from structured data, by performing natural language processing to extract the feature set from unstructured data, and/or by receiving input from an operator.

As an example, a feature set for a set of observations may include a first feature of feature 1 data, a second feature of feature 2 data, a third feature of feature 3 data, and so on. As shown, for a first observation, the first feature may have a value of feature 1 data 1, the second feature may have a value of feature 1 data 1, the third feature may have a value of feature 3 data 3, and so on. These features and feature values are provided as examples, and may differ in other examples. For example, the feature set may include one or more of the following features: technology stack IDs, tool IDs, selected technology stack compositions (e.g., tools included in technology stacks), contextual information (e.g., time instances, application types, cloud service providers, cloud resource IDs, task IDs, task definitions, application parameters, and/or memory consumption metrics.

As shown by reference number 215, the set of observations may be associated with a target variable. The target variable may represent a variable having a numeric value, may represent a variable having a numeric value that falls within a range of values or has some discrete possible values, may represent a variable that is selectable from one of multiple options (e.g., one of multiples classes, classifications, or labels) and/or may represent a variable having a Boolean value. A target variable may be associated with a target variable value, and a target variable value may be specific to an observation. In example 200, the target variable is Target Variable, which has a value of target variable 1 for the first observation. Target variables may include tool IDs, technology stack IDs, application parameters, information identifying memory consumption anomalies, and/or application error predictions, among other examples.

The target variable may represent a value that a machine learning model is being trained to predict, and the feature set may represent the variables that are input to a trained machine learning model to predict a value for the target variable. The set of observations may include target variable values so that the machine learning model can be trained to recognize patterns in the feature set that lead to a target variable value. A machine learning model that is trained to predict a target variable value may be referred to as a supervised learning model.

In some implementations, the machine learning model may be trained on a set of observations that do not include a target variable. This may be referred to as an unsupervised learning model. In this case, the machine learning model may learn patterns from the set of observations without labeling or supervision, and may provide output that indicates such patterns, such as by using clustering and/or association to identify related groups of items within the set of observations.

As shown by reference number 220, the machine learning system may train a machine learning model using the set of observations and using one or more machine learning algorithms, such as a regression algorithm, a decision tree algorithm, a neural network algorithm, a k-nearest neighbor algorithm, a support vector machine algorithm, or the like. After training, the machine learning system may store the machine learning model as a trained machine learning model 225 to be used to analyze new observations. As an example, the machine learning system may obtain training data for the set of observations based on technology stack selection, as described above in connection with FIG. 1D.

As shown by reference number 230, the machine learning system may apply the trained machine learning model 225 to a new observation, such as by receiving a new observation and inputting the new observation to the trained machine learning model 225. As shown, the new observation may include a first feature of feature 1 data X, a second feature of feature 2 data Y, a third feature of feature 3 data Z, and so on, as an example. The machine learning system may apply the trained machine learning model 225 to the new observation to generate an output (e.g., a result). The type of output may depend on the type of machine learning model and/or the type of machine learning task being performed.

For example, the output may include a predicted value of a target variable, such as when supervised learning is employed. Additionally, or alternatively, the output may include information that identifies a cluster to which the new observation belongs and/or information that indicates a degree of similarity between the new observation and one or more other observations, such as when unsupervised learning is employed.

As an example, the trained machine learning model 225 may predict a value of target variable A for the target variable of the clustered events for the new observation, as shown by reference number 235. Based on this prediction, the machine learning system may provide a first recommendation, may provide output for determination of a first recommendation, may perform a first automated action, and/or may cause a first automated action to be performed (e.g., by instructing another device to perform the automated action), among other examples. The first recommendation may include, for example, a recommendation to deactivate an application. The first automated action may include, for example, automatically deleting and/or deactivating an application.

In some implementations, the trained machine learning model 225 may classify (e.g., cluster) the new observation in a cluster, as shown by reference number 240. The observations within a cluster may have a threshold degree of similarity. As an example, if the machine learning system classifies the new observation in a first cluster (e.g., a feature 1 data cluster), then the machine learning system may provide a first recommendation, such as the first recommendation described above. Additionally, or alternatively, the machine learning system may perform a first automated action and/or may cause a first automated action to be performed (e.g., by instructing another device to perform the automated action) based on classifying the new observation in the first cluster, such as the first automated action described above.

As another example, if the machine learning system were to classify the new observation in a second cluster (e.g., a feature 2 data cluster), then the machine learning system may provide a second (e.g., different) recommendation (e.g., a recommendation to change an operating parameter associated with an application) and/or may perform or cause performance of a second (e.g., different) automated action, such as automatically changing an operating parameter associated with an application.

In some implementations, the recommendation and/or the automated action associated with the new observation may be based on a target variable value having a particular label (e.g., classification or categorization), may be based on whether a target variable value satisfies one or more threshold (e.g., whether the target variable value is greater than a threshold, is less than a threshold, is equal to a threshold, falls within a range of threshold values, or the like), and/or may be based on a cluster in which the new observation is classified.

In some implementations, the trained machine learning model 225 may be re-trained using feedback information. For example, feedback may be provided to the machine learning model. The feedback may be associated with actions performed based on the recommendations provided by the trained machine learning model 225 and/or automated actions performed, or caused, by the trained machine learning model 225. In other words, the recommendations and/or actions output by the trained machine learning model 225 may be used as inputs to re-train the machine learning model (e.g., a feedback loop may be used to train and/or update the machine learning model). For example, the feedback information may include technology stack selections, tool selections, application parameters, detected anomalies, and/or memory consumption values, among other examples.

In this way, in some implementations, the machine learning system may apply a rigorous and automated process to recommend technology stacks that are relevant to a particular DevOps task. In some implementations, the machine learning system may apply a rigorous and automated process to detect anomalies and/or optimize memory usage. The machine learning system enables recognition and/or identification of tens, hundreds, thousands, or millions of features and/or feature values for tens, hundreds, thousands, or millions of observations, thereby increasing accuracy and consistency and reducing delay associated with recommending technology stacks, detecting anomalies and/or optimizing memory consumption relative to requiring computing resources to be allocated for tens, hundreds, or thousands of operators for manually recommending technology stacks, detecting anomalies and/or optimizing memory consumption using the features or feature values.

As indicated above, FIG. 2 is provided as an example. Other examples may differ from what is described in connection with FIG. 2.

Figure 3:
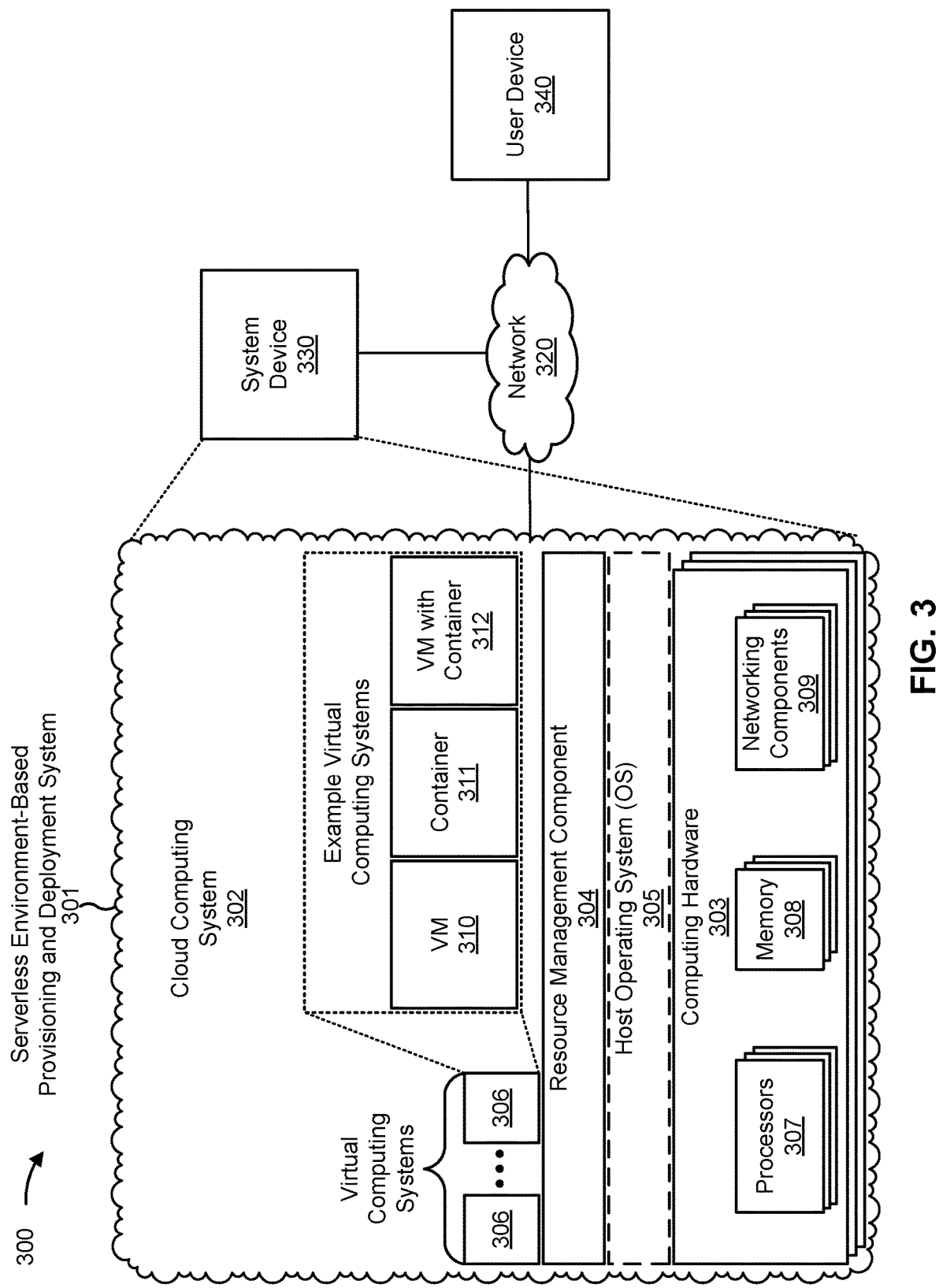
FIG. 3 is a diagram of an example environment in which systems and/or methods described herein may be implemented.

FIG. 3 is a diagram of an example environment 300 in which systems and/or methods described herein may be implemented. As shown in FIG. 3, environment 300 may include a serverless environment-based provisioning and deployment system 301, which may include one or more elements of and/or may execute within a cloud computing system 302. The cloud computing system 302 may include one or more elements 303-312, as described in more detail below. As further shown in FIG. 3, environment 300 may include a network 320, a system device 330 and/or a user device 340. Devices and/or elements of environment 300 may interconnect via wired connections and/or wireless connections.

The cloud computing system 302 includes computing hardware 303, a resource management component 304, a host operating system (OS) 305, and/or one or more virtual computing systems 306. The cloud computing system 302 may execute on, for example, an Amazon Web Services platform, a Microsoft Azure platform, or a Snowflake platform. The resource management component 304 may perform virtualization (e.g., abstraction) of computing hardware 303 to create the one or more virtual computing systems 306. Using virtualization, the resource management component 304 enables a single computing device (e.g., a computer or a server) to operate like multiple computing devices, such as by creating multiple isolated virtual computing systems 306 from computing hardware 303 of the single computing device. In this way, computing hardware 303 can operate more efficiently, with lower power consumption, higher reliability, higher availability, higher utilization, greater flexibility, and lower cost than using separate computing devices.

Computing hardware 303 includes hardware and corresponding resources from one or more computing devices. For example, computing hardware 303 may include hardware from a single computing device (e.g., a single server) or from multiple computing devices (e.g., multiple servers), such as multiple computing devices in one or more data centers. As shown, computing hardware 303 may include one or more processors 307, one or more memories 308, and/or one or more networking components 309. Examples of a processor, a memory, and a networking component (e.g., a communication component) are described elsewhere herein.

The resource management component 304 includes a virtualization application (e.g., executing on hardware, such as computing hardware 303) capable of virtualizing computing hardware 303 to start, stop, and/or manage one or more virtual computing systems 306. For example, the resource management component 304 may include a hypervisor (e.g., a bare-metal or Type 1 hypervisor, a hosted or Type 2 hypervisor, or another type of hypervisor) or a virtual machine monitor, such as when the virtual computing systems 306 are virtual machines 310. Additionally, or alternatively, the resource management component 304 may include a container manager, such as when the virtual computing systems 306 are containers 311. In some implementations, the resource management component 304 executes within and/or in coordination with a host operating system 305.

A virtual computing system 306 includes a virtual environment that enables cloud-based execution of operations and/or processes described herein using computing hardware 303. As shown, a virtual computing system 306 may include a virtual machine 310, a container 311, or a hybrid environment 312 that includes a virtual machine and a container, among other examples. A virtual computing system 306 may execute one or more applications using a file system that includes binary files, software libraries, and/or other resources required to execute applications on a guest operating system (e.g., within the virtual computing system 306) or the host operating system 305.

Although the serverless environment-based provisioning and deployment system 301 may include one or more elements 303-312 of the cloud computing system 302, may execute within the cloud computing system 302, and/or may be hosted within the cloud computing system 302, in some implementations, the serverless environment-based provisioning and deployment system 301 may not be cloud-based (e.g., may be implemented outside of a cloud computing system) or may be partially cloud-based. For example, the serverless environment-based provisioning and deployment system 301 may include one or more devices that are not part of the cloud computing system 302, such as device 400 of FIG. 4, which may include a standalone server or another type of computing device. The serverless environment-based provisioning and deployment system 301 may perform one or more operations and/or processes described in more detail elsewhere herein.

Network 320 includes one or more wired and/or wireless networks. For example, network 320 may include a cellular network, a public land mobile network (PLMN), a local area network (LAN), a wide area network (WAN), a private network, the Internet, and/or a combination of these or other types of networks. The network 320 enables communication among the devices of environment 300.

The system device 330 may include one or more computing devices on which the serverless environment-based provisioning and deployment system is implemented. The system device 330 may be, be similar to, include, or be included in the system device 102 depicted in FIG. 1A. The user device 340 may include one or more computing devices that interact with the serverless environment-based provisioning and deployment system 301. The user device 340 may include, for example, a computing device that a user uses to perform application development activities using the serverless environment-based provisioning and deployment system 301. The user device may be, be similar to, include, or be included in the user device 101 depicted in FIG. 1A.

The number and arrangement of devices and networks shown in FIG. 3 are provided as an example. In practice, there may be additional devices and/or networks, fewer devices and/or networks, different devices and/or networks, or differently arranged devices and/or networks than those shown in FIG. 3. Furthermore, two or more devices shown in FIG. 3 may be implemented within a single device, or a single device shown in FIG. 3 may be implemented as multiple, distributed devices. Additionally, or alternatively, a set of devices (e.g., one or more devices) of environment 300 may perform one or more functions described as being performed by another set of devices of environment 300.

Figure 4:
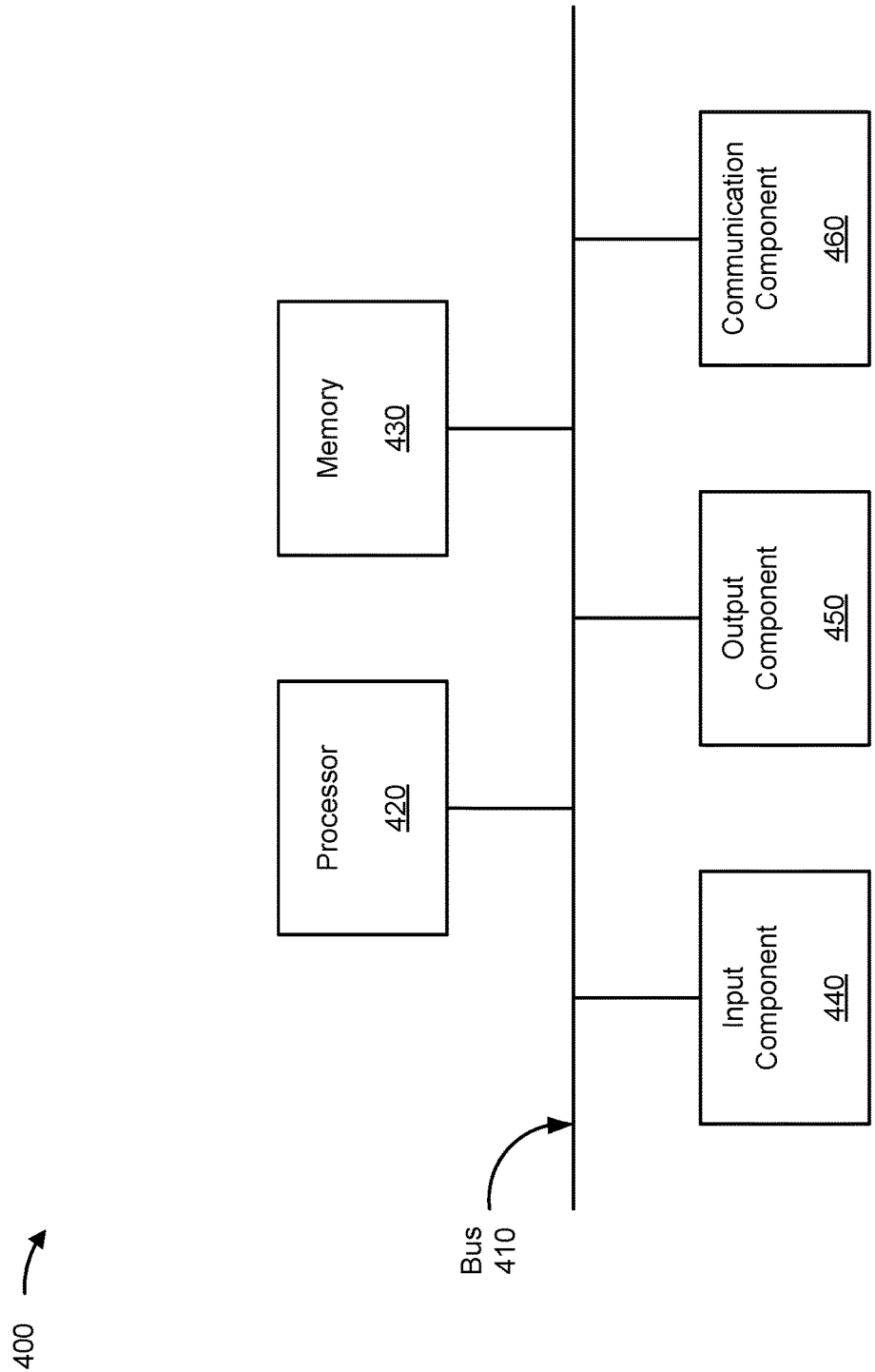
FIG. 4 is a diagram of example components of one or more devices of FIG. 2.

FIG. 4 is a diagram of example components of a device 400, which may correspond to the system device 330 and/or the user device 340. In some implementations, the system device 330 and/or the user device 340 include one or more devices 400 and/or one or more components of device 400. As shown in FIG. 4, device 400 may include a bus 410, a processor 420, a memory 430, an input component 440, an output component 450, and a communication component 460.

Bus 410 includes one or more components that enable wired and/or wireless communication among the components of device 400. Bus 410 may couple together two or more components of FIG. 4, such as via operative coupling, communicative coupling, electronic coupling, and/or electric coupling. Processor 420 includes a central processing unit, a graphics processing unit, a microprocessor, a controller, a microcontroller, a digital signal processor, a field-programmable gate array, an application-specific integrated circuit, and/or another type of processing component. Processor 420 is implemented in hardware, firmware, or a combination of hardware and software. In some implementations, processor 420 includes one or more processors capable of being programmed to perform one or more operations or processes described elsewhere herein.

Memory 430 includes volatile and/or nonvolatile memory. For example, memory 430 may include random access memory (RAM), read only memory (ROM), a hard disk drive, and/or another type of memory (e.g., a flash memory, a magnetic memory, and/or an optical memory). Memory 430 may include internal memory (e.g., RAM, ROM, or a hard disk drive) and/or removable memory (e.g., removable via a universal serial bus connection). Memory 430 may be a non-transitory computer-readable medium. Memory 430 stores information, instructions, and/or software (e.g., one or more software applications) related to the operation of device 400. In some implementations, memory 430 includes one or more memories that are coupled to one or more processors (e.g., processor 420), such as via bus 410.

Input component 440 enables device 400 to receive input, such as user input and/or sensed input. For example, input component 440 may include a touch screen, a keyboard, a keypad, a mouse, a button, a microphone, a switch, a sensor, a global positioning system sensor, an accelerometer, a gyroscope, and/or an actuator. Output component 450 enables device 400 to provide output, such as via a display, a speaker, and/or a light-emitting diode. Communication component 460 enables device 400 to communicate with other devices via a wired connection and/or a wireless connection. For example, communication component 460 may include a receiver, a transmitter, a transceiver, a modem, a network interface card, and/or an antenna.

Device 400 may perform one or more operations or processes described herein. For example, a non-transitory computer-readable medium (e.g., memory 430) may store a set of instructions (e.g., one or more instructions or code) for execution by processor 420. Processor 420 may execute the set of instructions to perform one or more operations or processes described herein. In some implementations, execution of the set of instructions, by one or more processors 420, causes the one or more processors 420 and/or the device 400 to perform one or more operations or processes described herein. In some implementations, hardwired circuitry is used instead of or in combination with the instructions to perform one or more operations or processes described herein. Additionally, or alternatively, processor 420 may be configured to perform one or more operations or processes described herein. Thus, implementations described herein are not limited to any specific combination of hardware circuitry and software.

The number and arrangement of components shown in FIG. 4 are provided as an example. Device 400 may include additional components, fewer components, different components, or differently arranged components than those shown in FIG. 4. Additionally, or alternatively, a set of components (e.g., one or more components) of device 400 may perform one or more functions described as being performed by another set of components of device 400.

Figure 5:
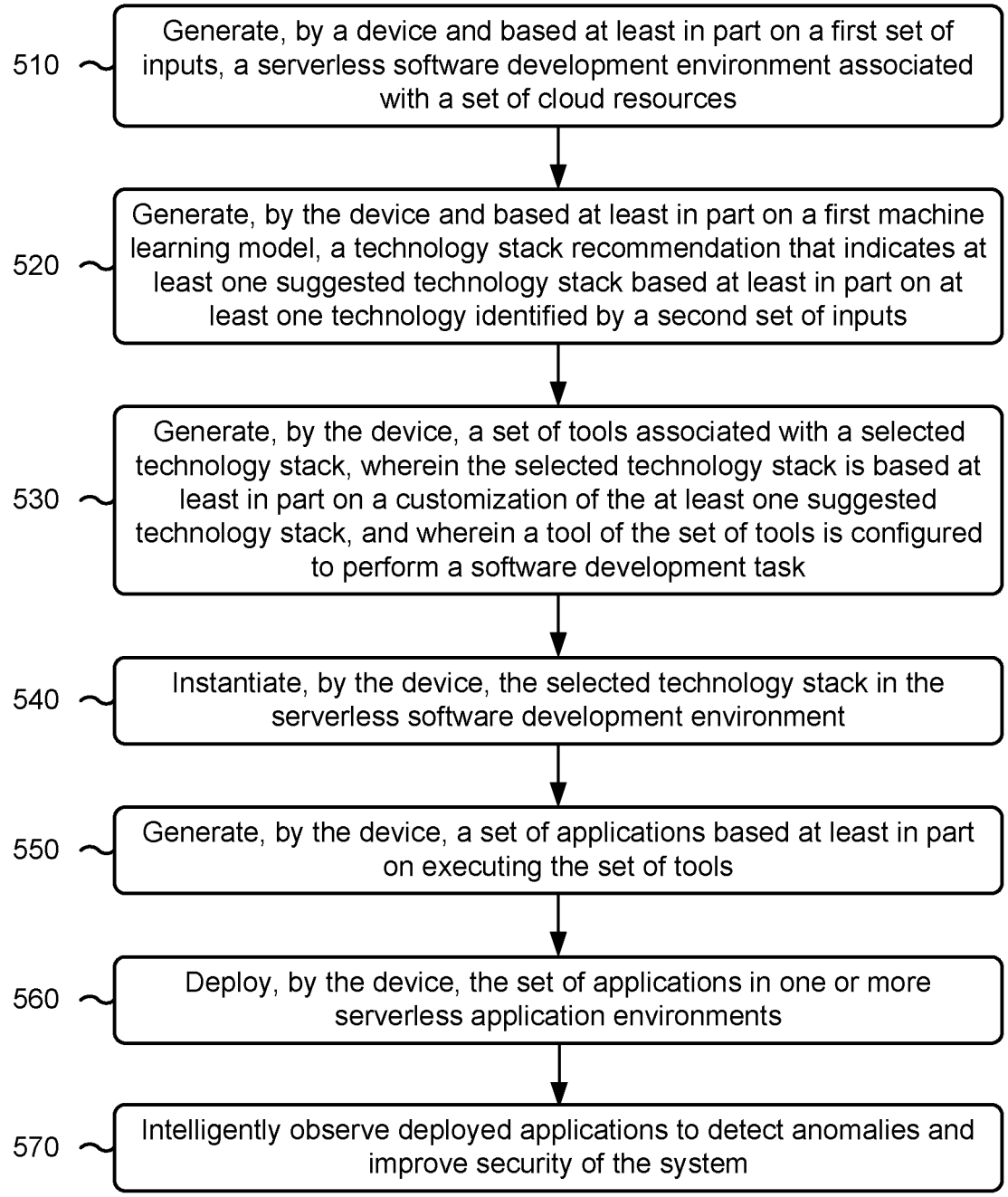
FIG. 5 is a flowchart of an example process relating to a serverless environment-based provisioning and deployment system.

FIG. 5 is a flowchart of an example process 500 associated with a serverless development environment-based provisioning and deployment system. In some implementations, one or more process blocks of FIG. 5 are performed by a device (e.g., the system device 330). In some implementations, one or more process blocks of FIG. 5 are performed by another device or a group of devices separate from or including the device, such as a user device (e.g., the user device 340). Additionally, or alternatively, one or more process blocks of FIG. 5 may be performed by one or more components of device 400, such as processor 420, memory 430, input component 440, output component 450, and/or communication component 460.

As shown in FIG. 5, process 500 may include generating, based at least in part on a first set of inputs, a serverless software development environment associated with a set of cloud resources (block 510). For example, the device may generate, based at least in part on a first set of inputs, a serverless software development environment associated with a set of cloud resources, as described above.

As further shown in FIG. 5, process 500 may include generating, based at least in part on a first machine learning model, a technology stack recommendation that indicates at least one suggested technology stack based at least in part on at least one technology identified by a second set of inputs (block 520). For example, the device may generate, based at least in part on a first machine learning model, a technology stack recommendation that indicates at least one suggested technology stack based at least in part on at least one technology identified by a second set of inputs, as described above.

As further shown in FIG. 5, process 500 may include generating a set of tools associated with a selected technology stack, wherein the selected technology stack is based at least in part on a customization of the at least one suggested technology stack, and wherein a tool of the set of tools is configured to perform a software development task (block 530). For example, the device may generate a set of tools associated with a selected technology stack, wherein the selected technology stack is based at least in part on a customization of the at least one suggested technology stack, and wherein a tool of the set of tools is configured to perform a software development task, as described above.

As further shown in FIG. 5, process 500 may include instantiating the selected technology stack in the serverless software development environment (block 540). For example, the device may instantiate the selected technology stack in the serverless software development environment, as described above.

As further shown in FIG. 5, process 500 may include generating a set of applications based at least in part on executing the set of tools (block 550). For example, the device may generate a set of applications based at least in part on executing the set of tools, as described above.

As further shown in FIG. 5, process 500 may include deploying the set of applications in one or more serverless application environments (block 560). For example, the device may deploy the set of applications in one or more serverless application environments, as described above.

As further shown in FIG. 5, process 500 may include intelligently observing deployed applications to detect anomalies and improve security of the system (block 570). For example, the device may intelligently observe the deployed applications in a serverless to detect anomalies (e.g., in a real-time manner) and to improve security of the system. The device also may provide detailed metrics and insights associated with the deployed applications.

Process 500 may include additional implementations, such as any single implementation or any combination of implementations described below and/or in connection with one or more other processes described elsewhere herein.

In a first implementation, executing the set of tools comprises executing, based at least in part on an execution blueprint, the tool, of the set of tools, to perform the software development task, the method further comprising destroying the tool based at least in part on a determination that the software development task is completed.

In a second implementation, alone or in combination with the first implementation, process 500 includes determining, by the device, feedback information associated with performance of at least one application of the set of applications, and performing, by the device, a mitigation task based at least in part on the feedback information.

In a third implementation, alone or in combination with one or more of the first and second implementations, determining the feedback information comprises generating a semantic network representing one or more relationships between two or more applications of the set of applications, and determining, based at least in part on an issue prediction machine learning model, a prediction associated with an impact of a failure of a first application, of the two or more applications, on a second application of the two or more applications.

In a fourth implementation, alone or in combination with one or more of the first through third implementations, determining the feedback information comprises determining a set of observation data associated with a plurality of operative states of the set of applications, generating an application dependency machine learning model based at least in part on the set of observation data, and determining, based at least in part on an application dependency machine learning model, at least one unused application of the set of applications, wherein performing the mitigation task comprises deactivating the at least one unused application.

In a fifth implementation, alone or in combination with one or more of the first through fourth implementations, determining the feedback information comprises extracting a set of features based at least in part on one or more memory metrics associated with the set of applications, determining a set of application parameters based at least in part on the set of features, and determining a set of relative influence metrics, wherein each influence metric of the set of influence metrics indicates an influence on memory consumption by a corresponding application parameter of the set of application parameters, and identifying an anomalous application parameter based at least in part on the set of influence metrics.

In a sixth implementation, alone or in combination with one or more of the first through fifth implementations, identifying the anomalous application parameter comprises identifying the anomalous application parameter based at least in part on an anomaly detection machine learning model.

In a seventh implementation, alone or in combination with one or more of the first through sixth implementations, performing the mitigation task comprises providing an indication of the anomalous application parameter for display by a feedback dashboard, the method further comprising receiving an indication of a root cause associated with the anomalous application parameter, and training the anomaly detection machine learning model based at least in part on the root cause.

In an eighth implementation, alone or in combination with one or more of the first through seventh implementations, process 500 includes generating, using the anomaly detection machine learning model, at least one recommendation of at least one additional mitigation task corresponding to at least one additional identified anomalous parameter.

In a ninth implementation, alone or in combination with one or more of the first through eighth implementations, generating the serverless software development environment comprises instantiating an orchestrator agent, generating, using the orchestrator agent, a dynamic provision container that is configured to be controlled by the orchestrator agent, and generating, based at least in part on a set of cloud credentials, the set of cloud resources using the dynamic provision container, discarding, using the orchestrator agent, the dynamic provision container based at least in part on a determination that the serverless software development environment is generated, and discarding the set of cloud credentials based at least in part on a determination that the cloud resources are created.

Although FIG. 5 shows example blocks of process 500, in some implementations, process 500 includes additional blocks, fewer blocks, different blocks, or differently arranged blocks than those depicted in FIG. 5. Additionally, or alternatively, two or more of the blocks of process 500 may be performed in parallel.

The foregoing disclosure provides illustration and description, but is not intended to be exhaustive or to limit the implementations to the precise forms disclosed. Modifications may be made in light of the above disclosure or may be acquired from practice of the implementations.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Although particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method, comprising:
generating, by a device and based at least in part on a first set of inputs, a serverless software development environment associated with a set of cloud resources;
generating, by the device and based at least in part on a first machine learning model, a technology stack recommendation that indicates at least one suggested technology stack based at least in part on at least one technology identified by a second set of inputs;
generating, by the device, a set of tools associated with a selected technology stack, wherein the selected technology stack is based at least in part on a customization of the at least one suggested technology stack, and wherein a tool of the set of tools is configured to perform a software development task;
instantiating, by the device, the selected technology stack in the serverless software development environment;
generating, by the device, a set of applications based at least in part on executing the set of tools;
deploying, by the device, the set of applications in one or more serverless application environments; and
deleting, by the device and using a deletion helper container, the serverless software development environment based at least in part on receiving an input instructing deletion of the serverless software development environment,
wherein an orchestrator agent is configured to control the deletion helper container.

2. The method of claim 1, wherein executing the set of tools comprises executing, based at least in part on an execution blueprint, the tool, of the set of tools, to perform the software development task, the method further comprising destroying the tool based at least in part on a determination that the software development task is completed.

3. The method of claim 1, further comprising:
determining, by the device, feedback information associated with performance of at least one application of the set of applications; and
performing, by the device, a mitigation task based at least in part on the feedback information.

4. The method of claim 3, wherein determining the feedback information comprises:
generating a semantic network representing one or more relationships between two or more applications of the set of applications; and
determining, based at least in part on an issue prediction machine learning model, a prediction associated with an impact of a failure of a first application, of the two or more applications, on a second application of the two or more applications.

5. The method of claim 3, wherein determining the feedback information comprises:
determining a set of observation data associated with a plurality of operative states of the set of applications;
generating an application dependency machine learning model based at least in part on the set of observation data; and
determining, based at least in part on the application dependency machine learning model, at least one unused application of the set of applications, wherein performing the mitigation task comprises deactivating the at least one unused application.

6. The method of claim 3, wherein determining the feedback information comprises:
extracting a set of features based at least in part on one or more memory metrics associated with the set of applications;
determining a set of application parameters based at least in part on the set of features; and
determining a set of relative influence metrics, wherein each influence metric of the set of influence metrics indicates an influence on memory consumption by a corresponding application parameter of the set of application parameters; and
identifying an anomalous application parameter based at least in part on the set of influence metrics.

7. The method of claim 6, wherein identifying the anomalous application parameter comprises identifying the anomalous application parameter based at least in part on an anomaly detection machine learning model.

8. The method of claim 7, wherein performing the mitigation task comprises providing an indication of the anomalous application parameter for display by a feedback dashboard, the method further comprising:
receiving an indication of a root cause associated with the anomalous application parameter; and
training the anomaly detection machine learning model based at least in part on the root cause.

9. The method of claim 8, further comprising generating, using the anomaly detection machine learning model, at least one recommendation of at least one additional mitigation task corresponding to at least one additional identified anomalous parameter.

10. The method of claim 1, wherein generating the serverless software development environment comprises:
instantiating the orchestrator agent;
generating, using the orchestrator agent, a dynamic provision container that is configured to be controlled by the orchestrator agent;
generating, based at least in part on a set of cloud credentials, the set of cloud resources using the dynamic provision container;
discarding, using the orchestrator agent, the dynamic provision container based at least in part on a determination that the serverless software development environment is generated; and
discarding the set of cloud credentials based at least in part on a determination that the cloud resources are created.

11. A device, comprising:
one or more memories; and
one or more processors, coupled to the one or more memories, configured to:
generate a serverless software development environment associated with a set of cloud resources;
generate a set of tools associated with a selected technology stack of at least one suggested technology stack, wherein the selected technology stack is based at least in part on a customization of the at least one suggested technology stack,
wherein the at least one suggested technology stack is based at least in part on a first machine learning model, and
wherein a tool of the set of tools is configured to perform a software development task;
instantiate the selected technology stack in the serverless software development environment;
generate a set of applications based at least in part on executing the set of tools;
deploy the set of applications in one or more serverless application environments; and
delete, using a deletion helper container, the serverless software development environment based at least in part on receiving a user input instructing deletion of the serverless software development environment,
wherein an orchestrator agent is configured to control the deletion helper container.

12. The device of claim 11, wherein the one or more processors, to instantiate the selected technology stack in the serverless software development environment, are configured to:
register, using the orchestrator agent, a runner agent based at least in part on a set of runner registration parameters,
wherein the runner agent comprises an isolated container;
generate, using the runner agent, a helper agent that is configured to be controlled by the runner agent, the helper agent comprising an isolated runner registration container; and
instantiate the selected technology stack using the helper agent; and
discard the runner agent based at least in part on determining that the selected technology stack is instantiated.

13. The device of claim 12, wherein the one or more processors, to discard the runner agent, are configured to:
instantiate the orchestrator agent;
generate, using the orchestrator agent, the deletion helper container that is configured to be controlled by the orchestrator agent; and
delete the runner agent using the deletion helper container.

14. The device of claim 11, wherein the one or more processors are further configured to:
determine feedback information associated with performance of at least one application of the set of applications; and
perform a mitigation task based at least in part on the feedback information.

15. A non-transitory computer-readable medium storing a set of instructions, the set of instructions comprising:
one or more instructions that, when executed by one or more processors of a device, cause the device to:
generate, based at least in part on a first set of inputs, a serverless software development environment associated with a set of cloud resources;
generate, using the serverless software development environment, a set of applications based at least in part on executing a set of tools associated with a selected technology stack of at least one suggested technology stack,
wherein the selected technology stack is based at least in part on a customization of the at least one suggested technology stack,
wherein the at least one suggested technology stack is based at least in part on a first machine learning model, and
wherein a tool of the set of tools is configured to perform a software development task;
deploy the set of applications in one or more serverless application environments;
determine, based at least in part on a second machine learning model, feedback information associated with performance of at least one application of the set of applications;
perform a mitigation task based at least in part on the feedback information; and
delete, using a deletion helper container, the serverless software development environment based at least in part on receiving an input instructing deletion of the serverless software development environment,
wherein an orchestrator agent is configured to control the deletion helper container.

16. The non-transitory computer-readable medium of claim 15, wherein the one or more instructions that cause the device to determine the feedback information, cause the device to:
generate a semantic network representing one or more relationships between two or more applications of the set of applications; and
determine, based at least in part on an issue prediction machine learning model, a prediction associated with an impact of a failure of a first application, of the two or more applications, on a second application of the two or more applications.

17. The non-transitory computer-readable medium of claim 15, wherein the one or more instructions that cause the device to determine the feedback information, cause the device to:
determine a set of observation data associated with a plurality of operative states of the set of applications;

generate an application dependency machine learning model based at least in part on the set of observation data; and determine, based at least in part on an application dependency machine learning model, at least one unused application of the set of applications, wherein the one or more instructions, that cause the device to perform the mitigation task, cause the device to deactivate the at least one unused application.

18. The non-transitory computer-readable medium of claim 15, wherein the one or more instructions that cause the device to determine the feedback information, cause the device to:

extract a set of features based at least in part on one or more memory metrics associated with the set of applications;

determine a set of application parameters based at least in part on the set of features;

determine a set of relative influence metrics, wherein each influence metric of the set of relative influence metrics indicates an influence on memory consumption by a corresponding application parameter of the set of application parameters; and identify an anomalous application parameter based at least in part on the set of relative influence metrics and an anomaly detection machine learning model.

19. The non-transitory computer-readable medium of claim 18, wherein the one or more instructions, that cause the device to determine the feedback information, cause the device to detect a memory consumption deviation based at least in part on a change in memory consumption satisfying a deviation condition, wherein the one or more instructions, that cause the device to identify the anomalous application parameter, cause the device to identify the anomalous application parameter based at least in part on detecting the memory consumption deviation.

20. The non-transitory computer-readable medium of claim 18, wherein the one or more instructions, that cause the device to perform the mitigation task, cause the device to provide an indication of the anomalous application parameter for display by a feedback dashboard, and wherein the one or more instructions further cause the device to:

receive an indication of a root cause associated with the anomalous application parameter;

train the anomaly detection machine learning model based at least in part on the root cause; and generate, using the anomaly detection machine learning model, at least one recommendation of at least one additional mitigation task corresponding to at least one additional identified anomalous parameter.

* * * * *